United States Patent
Gao et al.

(10) Patent No.: US 10,725,725 B2
(45) Date of Patent: Jul. 28, 2020

(54) ELECTRONIC DEVICE AND MODE SWITCHING METHOD

(71) Applicant: Lenovo (Beijing) Co., Ltd., Beijing (CN)

(72) Inventors: Yan Gao, Beijing (CN); Jie Xia, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/854,837

(22) Filed: Sep. 15, 2015

(65) Prior Publication Data
US 2017/0003756 A1 Jan. 5, 2017

(30) Foreign Application Priority Data
Jun. 30, 2015 (CN) .......................... 2015 1 0379405

(51) Int. Cl.
*G06F 3/03* (2006.01)
*G06F 3/147* (2006.01)
*G06F 1/16* (2006.01)
*G06F 3/0487* (2013.01)
*G06F 3/0488* (2013.01)
(Continued)

(52) U.S. Cl.
CPC ............ *G06F 3/147* (2013.01); *G06F 1/1624* (2013.01); *G06F 1/1641* (2013.01); *G06F 1/1675* (2013.01); *G06F 3/0304* (2013.01); *G06F 3/038* (2013.01); *G06F 3/0487* (2013.01); *G06F 3/04886* (2013.01); *G06F 3/1423* (2013.01); *G06F 2203/04102* (2013.01); *G06F 2203/04803* (2013.01); *G09G 2380/02* (2013.01)

(58) Field of Classification Search
CPC ........ G06F 3/03; G06F 1/1641; G06F 1/1675; G06F 3/147
USPC .......................................................... 345/156
See application file for complete search history.

(56) References Cited

U.S. PATENT DOCUMENTS

| | | | |
|---|---|---|---|
| 8,810,627 B1 * | 8/2014 | Cho ..................... | H04N 5/2258 348/38 |
| 8,928,552 B2 * | 1/2015 | Aono .................... | G06F 1/1616 345/1.1 |
| 9,348,370 B2 * | 5/2016 | Song .................... | G06F 1/1652 |

(Continued)

OTHER PUBLICATIONS

Office Action dated Feb. 26, 2016 out of corresponding German application No. 10 2015 116 604.6 (19 pages including English translation).

*Primary Examiner* — Benyam Ketema
(74) *Attorney, Agent, or Firm* — Brinks Gilson & Lione; John C. Freeman

(57) ABSTRACT

An electronic device and a mode switching method thereof are disclosed. The electronic device includes a first body; a connecting body; a second body being connected to the first body through the connecting body. Based on the connecting body, the electronic device has at least three modes, wherein in a first mode the first body and the second body have a first relative positional relationship, in a second mode the first body and the second body have a second relative positional relationship, and in a third mode the first body and the second body have a third relative positional relationship. The electronic device can switch from the second mode to the first mode with a first manner, and switch from the third mode to the first mode with a second manner, wherein the first manner and the second manner are different.

17 Claims, 15 Drawing Sheets

(51) Int. Cl.
*G06F 3/038* (2013.01)
*G06F 3/14* (2006.01)

(56) References Cited

U.S. PATENT DOCUMENTS

| | | | | |
|---|---|---|---|---|
| 9,733,744 B2* | 8/2017 | Lee | ........................ | G06F 3/0412 |
| 9,864,410 B2* | 1/2018 | La | ........................ | G06F 1/1652 |
| 2002/0104769 A1* | 8/2002 | Kim | ........................ | G06F 1/1601 |
| | | | | 206/320 |
| 2007/0032105 A1* | 2/2007 | Lee | ........................ | H04M 1/0216 |
| | | | | 439/100 |
| 2009/0296331 A1* | 12/2009 | Choy | ........................ | G06F 1/1616 |
| | | | | 361/679.09 |
| 2010/0041439 A1* | 2/2010 | Bullister | ........................ | G06F 1/1615 |
| | | | | 455/566 |
| 2010/0060548 A1* | 3/2010 | Choi | ........................ | G06F 3/0414 |
| | | | | 345/1.3 |
| 2010/0060664 A1* | 3/2010 | Kilpatrick, II | ........ | G06F 1/1616 |
| | | | | 345/650 |
| 2010/0064536 A1* | 3/2010 | Caskey | ........................ | G06F 1/1616 |
| | | | | 33/303 |
| 2010/0232100 A1* | 9/2010 | Fukuma | ........................ | F16G 13/18 |
| | | | | 361/679.01 |
| 2011/0134144 A1* | 6/2011 | Moriwaki | ........................ | G09G 3/3208 |
| | | | | 345/660 |
| 2011/0241998 A1* | 10/2011 | McKinney | ........................ | G06F 1/1616 |
| | | | | 345/168 |
| 2012/0262367 A1* | 10/2012 | Chiu | ........................ | G06F 1/1626 |
| | | | | 345/156 |
| 2012/0307423 A1* | 12/2012 | Bohn | ........................ | G06F 1/1641 |
| | | | | 361/679.01 |
| 2013/0321264 A1* | 12/2013 | Park | ........................ | G06F 3/01 |
| | | | | 345/156 |
| 2014/0152553 A1* | 6/2014 | Cha | ........................ | G06F 3/013 |
| | | | | 345/156 |
| 2014/0218321 A1* | 8/2014 | Lee | ........................ | G06F 1/1652 |
| | | | | 345/173 |
| 2014/0226275 A1* | 8/2014 | Ko | ........................ | G06F 1/1626 |
| | | | | 361/679.27 |
| 2014/0285476 A1* | 9/2014 | Cho | ........................ | G06F 1/1601 |
| | | | | 345/204 |
| 2015/0009128 A1* | 1/2015 | Matsumoto | ........................ | G06F 3/03 |
| | | | | 345/156 |
| 2015/0355728 A1* | 12/2015 | Cho | ........................ | G06F 1/1652 |
| | | | | 345/173 |
| 2016/0041680 A1* | 2/2016 | Chi | ........................ | H04B 1/385 |
| | | | | 345/173 |
| 2016/0070304 A1* | 3/2016 | Shin | ........................ | H04M 1/0268 |
| | | | | 361/679.26 |
| 2016/0179236 A1* | 6/2016 | Shin | ........................ | G06F 1/1616 |
| | | | | 345/173 |
| 2016/0211313 A1* | 7/2016 | Kim | ........................ | H01L 27/3276 |

* cited by examiner

ELECTRONIC DEVICE AND MODE SWITCHING METHOD

This application claims priority to Chinese patent application No. 201510379405.5 filed on Jun. 30, 2015, the entire contents of which are incorporated herein by reference.

The present disclosure relates to the field of electronic product, and more particularly, to an electronic device of which the appearance can be variable and a mode switching method applied to the electronic device.

BACKGROUND

With the rapid development of science and technology in recent years, using experience of intelligent terminals such as cell phones and the like has also been hit by a great impact, operating from early straight to today's touch-screen operation, from early functional machine to today's intelligent machines. Either form or function, the terminal is undergoing tremendous change.

For example, in order to meet the user's various usage scenarios, terminal which switches modes through the shaft, i.e., through the manner of rotating exists. However, it still expects new terminal which can switch modes in a number of ways.

SUMMARY

In view of the above situation, it is desirable to provide a novel electronic device and mode switching method, so that the experience of user can be further improved.

According to an embodiment of the present disclosure, there is provided an electronic device, comprising: a first body; a connecting body; a second body being connected to the first body through the connecting body; wherein based on the connecting body, the electronic device has at least three modes, wherein in a first mode the first body and the second body have a first relative positional relationship, in a second mode the first body and the second body have a second relative positional relationship, and in a third mode the first body and the second body have a third relative positional relationship, the first relative positional relationship, the second relative positional relationship, and the third positional relationship are different from each other; and the electronic device can switch from the second mode to the first mode with a first manner, and switch from the third mode to the first mode with a second manner, wherein the first manner and the second manner are different.

According to another embodiment of the present disclosure, there is provided a mode switching method applied to an electronic device, the mode switching method comprising detecting a posture switching and/or a posture switching manner of the electronic device; and controlling a mode switching of the electronic device according to a detected posture switching and/or posture switching manner; wherein the electronic device comprises: a first body; a connecting body; a second body being connected to the first body through the connecting body; wherein based on the connecting body, the electronic device has at least three postures, wherein in a first posture the first body and the second body have a first relative positional relationship, in a second posture the first body and the second body have a second relative positional relationship, and in a third posture the first body and the second body have a third relative positional relationship, the first relative positional relationship, the second relative positional relationship, and the third positional relationship are different from each other; and the electronic device can switch from the second posture to the first posture with a first manner, and switch from the third posture to the first posture with a second manner, wherein the first manner and the second manner are different.

The mode switching method according to an embodiment of the present disclosure further comprises: switching display content on a display of the electronic device according to a mode switching of the electronic device.

It is to be understood that both the foregoing general descriptions and the following detailed descriptions are exemplary and intended to provide further explanations of the claimed technique

DETAILED DESCRIPTION

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should all fall into the protection scope of the present disclosure. Hereinafter, the embodiments of the present disclosure will be described in detail with reference to the accompanying drawings.

Firstly, the electronic device according to the embodiment of the present disclosure is described with reference to FIG. 1. The electronic device 1 according to an embodiment of the present disclosure may be such an electronic device like tablet computer, smart phone, personal digital assistant, smart wearable device. In the following, for convenience of description, the smart phone will be described as an example of the electronic device.

Figure 1:
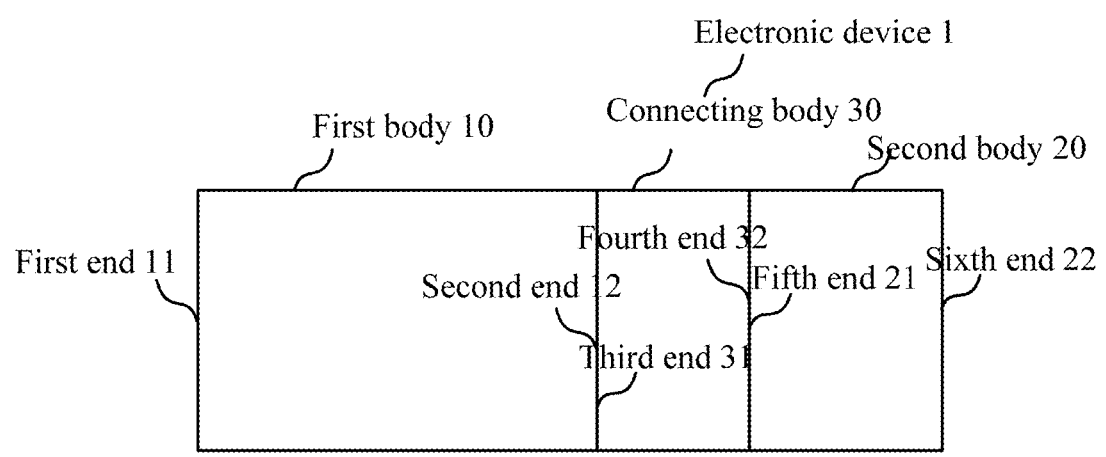
FIG. 1 is schematic diagrams illustrating an electronic device according to an embodiment the present disclosure.

As shown in FIG. 1, the electronic device 1 according to an embodiment of the present disclosure comprises a first body 10, a second body 20, and a connecting body 30. In other words, the body other than the first body 10 and the second body 20 in the electronic device 1 is the connecting body 30. The first body 10 has a first end 11 and a second end 12; the connecting body 30 has a third end 31 and a fourth end 32, the third end 31 is connected to the second end 12; the second body 20 has a fifth end 21 and a sixth end 22, the fifth end 21 is connected to the fourth end 32, the second body 20 is at least capable of rotating around the first body 10 based on the connecting body 30.

Wherein, based on the connecting body 30, the electronic device 1 has at least three modes, wherein in a first mode the first body 10 and the second body 20 have a first relative positional relationship, in a second mode the first body 10 and the second body 20 have a second relative positional relationship, and in a third mode the first body 10 and the second body 20 have a third relative positional relationship, the first relative positional relationship, the second relative positional relationship, and the third positional relationship are different from each other.

The electronic device 1 can switch from the second mode to the first mode with a first manner, and switch from the third mode to the first mode with a second manner, wherein the first manner and the second manner are different.

Configuration of the connecting body 30 will be described below in detail, the connecting body 30 may be composed by a plurality of rotary members and a non-rotary member there between, wherein rotary members that implement a connection between the connecting body 30 and the first body 10 and a connection between the connecting body 30 and the second body 20 will be uniformly considered to a compose member of the connecting body 30. In other words, the body other than the first body 10 and the second body 20 in the electronic device 1 is all considered as the connecting body 30. In addition, it should be noted that the term "end" used herein refers to a part in a certain range of respective end surfaces of the first body 10, the second body 20, and the connecting body 30.

Configuration of the connecting body 30 of the electronic device 1 and a mode switching process of the electronic device 1 in a case where the second body 20 at least rotates relative to the first body 10 based on the connecting body 30 will be further described below in detail with reference to the accompanying drawings.

Figure 2A:
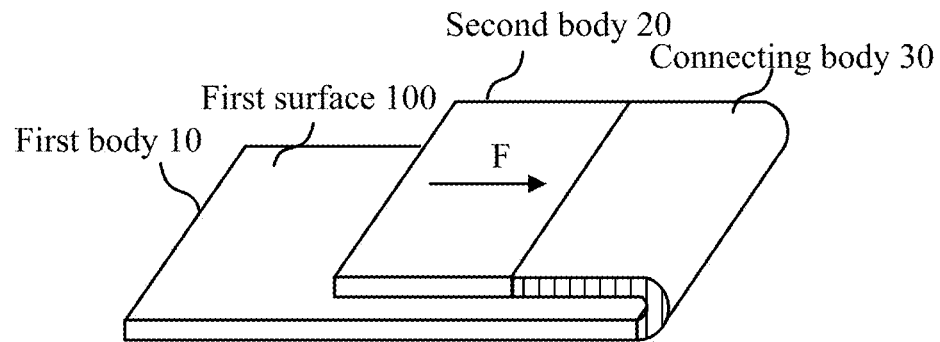
FIGS. 2A to 2C are schematic diagrams illustrating a switching process between a first mode and a second mode of the electronic device according to a first embodiment of the present disclosure.
Figure 2B:
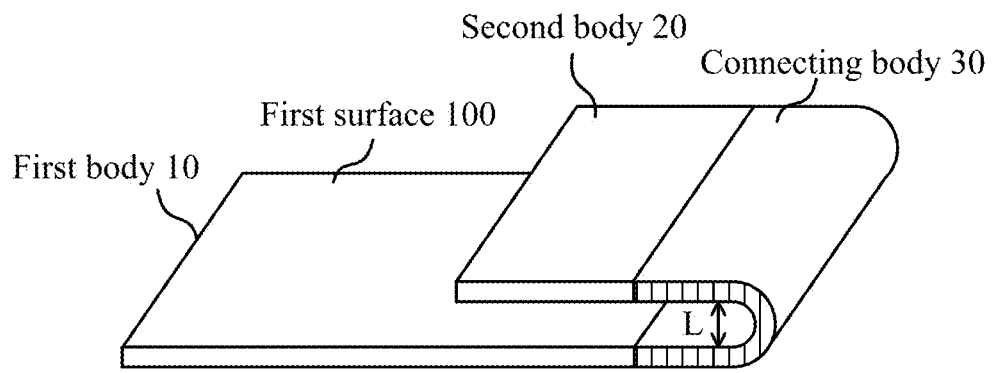
Figure 2C:
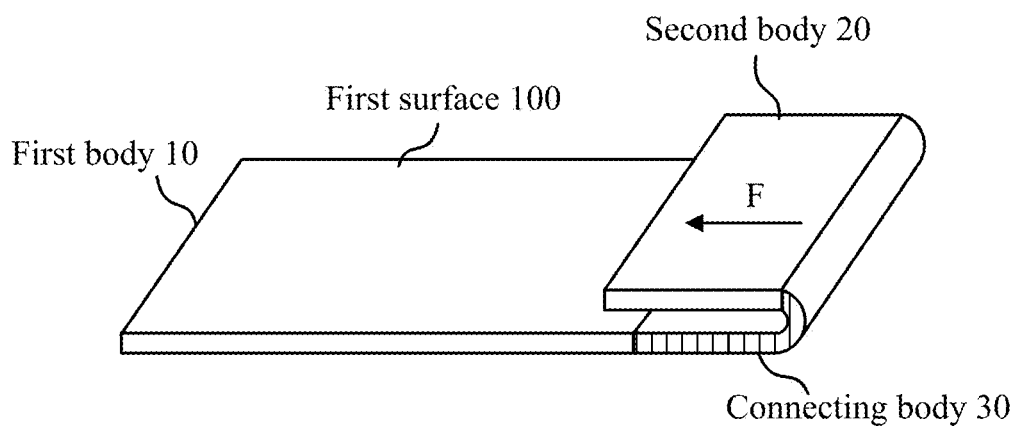

FIGS. 2A to 2C are schematic diagrams illustrating a switching process between a first mode and a second mode of the electronic device according to a first embodiment of the present disclosure. Specifically, FIG. 2A illustrates the first mode of the electronic device according to the first embodiment of the present disclosure, FIG. 2C illustrates the second mode of the electronic device according to the first embodiment of the present disclosure, and FIG. 2B illustrates an arbitrary mode during a switching process between the first mode and the second mode according to the first embodiment of the present disclosure.

As shown in FIG. 2A, in the first mode, a first surface 100 of the first body 10 is covered by the connecting body 30 and the second body 20. As shown in FIG. 2C, in the second mode, a surface composed by the first surface 100 of the first body 10 and a first surface 300 of the connecting body 30 is covered by the second body 20. As will be appreciated that, coverage in the first mode and the second mode comprises a total coverage and a partial coverage. Specifically, when the second body 20 is short enough, in the second mode shown in FIG. 2C, a surface composed by the first surface 100 of the first body 10 and a first surface 300 of the connecting body 30 being covered by the second body 20 may be that the second body 20 covers only the first surface 300 of the connecting body 30.

As shown in FIG. 2B, in an arbitrary mode in a switching process between the first mode and the second mode, because there is damping between respective members that compose the connecting body 30, so the arbitrary mode is a mode that can maintain stable without an external force. Based on the same reasons, in this case, the first mode and the second mode also are modes that can maintain stable without an external force. The present disclosure is not limited thereto, the first mode, the second mode, and the arbitrary mode during a switching process between the first mode and the second mode may probably be modes that require an external force to maintain stable. Configuration of the connecting body 30 will be described below in detail with reference to the accompanying drawings.

In addition, as shown in FIGS. 2A to 2C, in the first mode and the second mode, a maximum distance between corresponding points of the first body 10 and the second body 20 is less than a first predetermined threshold L. As will be appreciated, the corresponding points of the first body 10 and the second body 20 are a pair of intersection points of a straight line that vertically passes through a plane where the first body 10 and the second body 20 reside on the aforesaid plane. In the electronic device according to the first embodiment of the present disclosure as shown in FIGS. 2A to 2C, the first body 10 and the second body 20 are capable of being in an approximate fitting in the first mode, the second mode, and an arbitrary state between the two. That is, the first threshold L may be 5 mm or less.

In one case, in a process that the electronic device switches from the first mode to the second mode through the arbitrary mode, a distance between the sixth end 22 of the second body 20 and the first surface 100 of the first body 10 is maintained as smaller than the first predetermined threshold. The distance between the sixth end 22 of the second body 20 and the first surface 100 is a distance between any point on the sixth end 22 and a corresponding point on the first body 10.

In another case, when switching between the first mode and the second mode, a distance between the first surface 100 of the first body 10 and a first surface 200 of the second body 20 is also smaller than the first predetermined threshold. That is to say, in this case, the first body 10 and the second body 20, on the whole, slide relatively in parallel to execute mode switching. In the following, configuration of the connecting body 30 will be described with reference to the accompanying drawing to illustrate correspondence between a different mode switching process and configuration of the connecting body 30.

In addition, in the mode switching process shown in FIGS. 2A to 2C, an external force needs to be applied on the electronic device. Specifically, in the first mode shown in FIG. 2A, when an external force F that has a component in a direction from the sixth end 22 to the fifth end 21 is applied on the second body 20, and a magnitude of the component of the external force satisfies a first predetermined condition, the electronic device switches from the first mode to the second mode. Likewise, in the second mode shown in FIG. 2C, when an external force F that has a component in a direction from the fifth end 21 to the sixth end 22 is applied on the second body 20, and a magnitude of the component of the external force satisfies a first predetermined condition, the electronic device switches from the second mode to the first mode. As will be appreciated, the external force applied on the second body 20 of the electronic device is transmitted to the connecting body 30 to overcome the damping between respective members of the connecting body 30. Configuration of the connecting body 30 will be described below with reference to the accompanying drawing, to illustrate correspondence between the force that causes a mode switching to the electronic device and the configuration of the connecting body 30.

Figure 3:
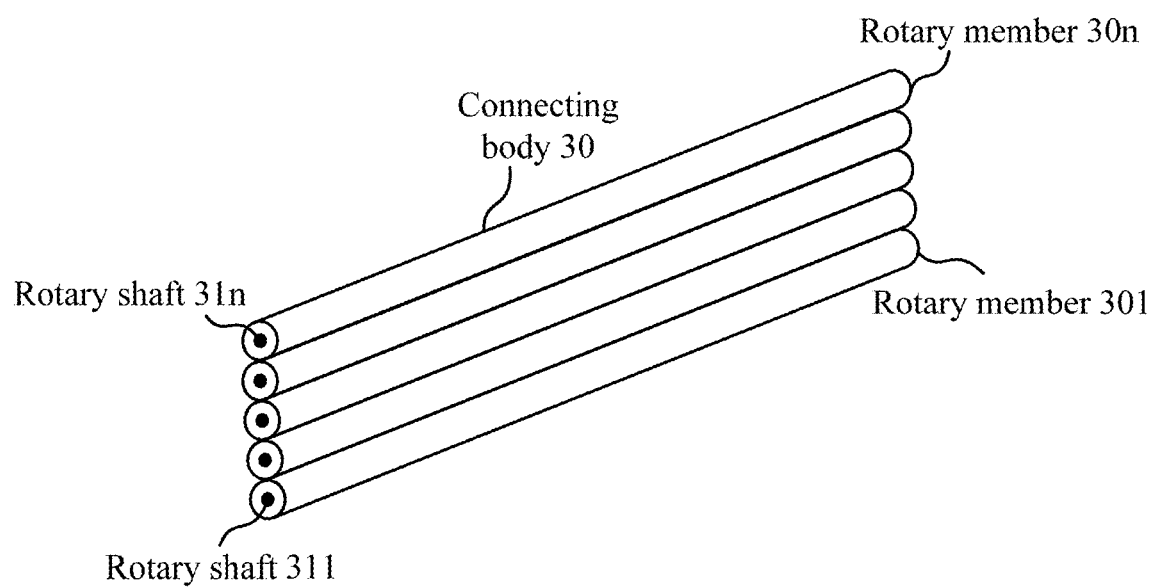
FIG. 3 is a schematic diagram further illustrating the connecting body according to the first embodiment of the present disclosure.

FIG. 3 is a schematic diagram further illustrating the connecting body according to the first embodiment of the present disclosure. As shown in FIG. 3, the connecting body 30 according to the first embodiment of the present disclosure may comprise at least three rotary members 301-30$n$ ($n$ is an integer larger than or equal to 3), each of the at least three rotary members 301-30$n$ has a self-rotary shaft 311-31$n$, respective self-rotary shafts 311-31$n$ of the at least three rotary members 301-30$n$ are parallel to each other. For example, when an external force applied on one rotary member 301 is vertical to the self-rotary shaft 311 thereof and a magnitude of a component in a direction tangential to an outer surface of the one rotary member 301 satisfies a second predetermined condition, the one rotary member 301 can rotate around the self-rotary shaft 311 thereof. Here, the second predetermined condition is associated with manufacturing material, manufacturing process and other factors of the at least three rotary members 301-30$n$. In addition, when there is no external force that satisfies the second predetermined condition on each of the at least three rotary members 301-30$n$, the at least three rotary members may 301-30$n$ probably maintain a mutual stability due to the damping, so as to ensure a relative stable state between the first body 10, the second body 20, and the connecting body 30 of the electronic device 1.

As shown above with reference to FIGS. 2A to 2C, the external force applied on the second body 20 is for making at least one rotary member in the connecting body 30 satisfy the aforesaid second predetermined condition and thereby rotate around the self-rotary shaft thereof. Since in a process of transmitting the external force applied on the second body 20 to at least one rotary member in the connecting body 30, there may be a direction difference (that is, the direction from the sixth end 22 to the fifth end 21 may probably be different than the direction vertical to the self-rotary shaft thereof and tangential to an outer surface of the one rotary member) or other loss, the first predetermined condition may be larger than the second predetermined condition.

Furthermore, in the first embodiment of the present disclosure, the connecting body 30 according to the first embodiment of the present disclosure may be composed only by the at least three rotary members 301-30$n$. In addition, in an example of the first embodiment of the present disclosure, when one rotary member (e.g., rotary member 301) rotates, the other rotary members (rotary members 302-30$n$) rotate accordingly. For example, the at least three rotary members 301-30$n$ are gear members that engage with each other, when one gear member rotates, it will drive all other gear members that engage to rotate in linkage with the same line speed (with the same angular velocity in the case of the same radius). Alternatively, when all the rotary members rotate in linkage, rotation speeds of the respective rotary members (line speed and/or angular velocity) may probably be different due to different engagement manners and different friction and consumption of the respective rotary members. In addition, in another example of the first embodiment of the present disclosure, when one rotary member (e.g., rotary member 301) rotates, at least one of the other rotary members does not rotate, that is, not all the rotary members are in linkage, instead, there is at least one rotary member that is not in linkage.

In a case where all the rotary members of the connecting body 30 are in linkage, because rotation of one rotary member causes all the other rotary members to rotate at the same or different rotation speed, so in the mode switching process shown in FIGS. 2A to 2C, the first body 10 and the second body 20, on a whole, cannot maintain sliding in parallel, instead, since rotation of all the rotary members in the connecting body 30 has fluctuation. In contrast, in a case where there is at least one rotary member that is not in linkage in the connecting body 30, probably, only rotary members in a folded region of the connecting body 30 rotate, rotary members in the other regions of the connecting body 30 do not rotate in linkage, thus implementing that the first body 10 and the second body 20 maintains sliding in parallel on a whole in the mode switching process shown in FIGS. 2A to 2C.

Figure 4A:
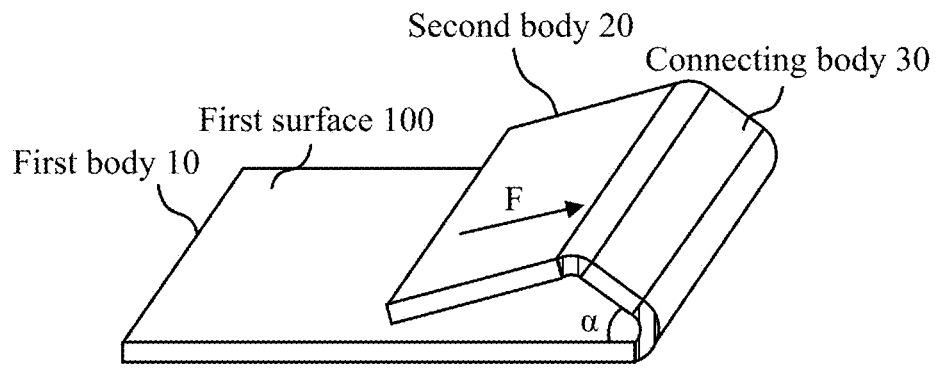
FIGS. 4A to 4C are schematic diagrams illustrating a switching process between the first mode and the second mode of the electronic device according to a second embodiment of the present disclosure.
Figure 4B:
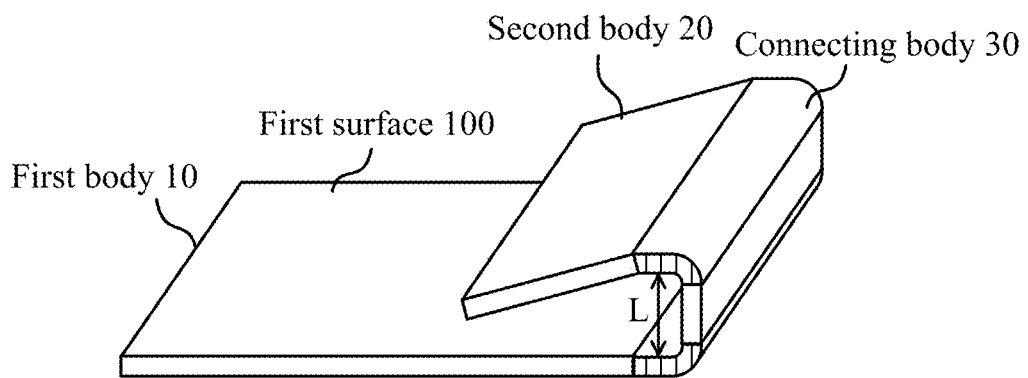
Figure 4C:
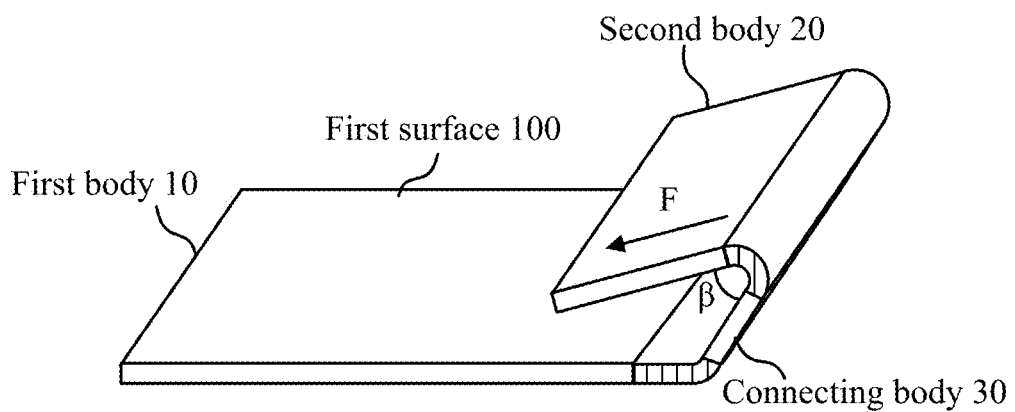

FIGS. 4A to 4C are schematic diagrams illustrating a switching process between the first mode and the second mode of the electronic device according to a second embodiment of the present disclosure. Specifically, FIG. 4A illustrates the first mode of the electronic device according to the second embodiment of the present disclosure, FIG. 4C illustrates the second mode of the electronic device according to the second embodiment of the present disclosure, and FIG. 4B illustrates an arbitrary mode during a switching process between the first mode and the second mode according to the second embodiment of the present disclosure.

Similar to the electronic device according to the first embodiment of the present disclosure shown in FIGS. 2A to 2C, as shown in FIG. 4A, in the first mode, a first surface 100 of the first body 10 is covered by the connecting body 30 and the second body 20. As shown in FIG. 4C, in the second mode, a surface composed by the first surface 100 of the first body 10 and a first surface 300 of the connecting body 30 is covered by the second body 20.

Likewise, similar to the electronic device according to the first embodiment of the present disclosure shown in FIGS. 2A to 2C, the arbitrary mode in a switching process between the first mode and the second mode may be is a mode that can maintain stable without an external force, or a mode that requires an external force to maintain stable.

It should be noted that, the electronic device according to the second embodiment of the present disclosure as shown in FIGS. 4A to 4C differs from the electronic device according to the first embodiment of the present disclosure as shown in FIGS. 2A to 2C in: since configuration of the connecting body 30 is different than that of the connecting body of the electronic device according to the first embodiment described with reference to FIG. 3, so in the process of switching from the first mode shown in FIG. 4A to the second mode shown in FIG. 4C, the first body 10 and the second body 20, on the whole, do not slide in parallel in an approximate fitting, instead, only the sixth end 22 of the second body 20 slides in an approximate fitting with the first body 10. That is to say, always there is a first angle α between the first surface 100 of the first body 10 and the first surface 200 of the second body 20, and always there is a second angle β between the second body 20 and the connecting body 30.

Although in the second embodiment of the present disclosure, the first body 10 and the second body 20, on the whole, do not slide in parallel in an approximate fitting, as shown in FIGS. 4A to 4C, in the first mode and the second mode, a maximum distance between corresponding points of the first body 10 and the second body 20 is also less than a first predetermined threshold. As will be appreciated, the first predetermined threshold in the second embodiment of the present disclosure will be larger than the first predetermined threshold in the first embodiment thereof, for example, the first predetermined threshold in the second embodiment of the present disclosure is 1 cm, its specific length mainly depends on the non-rotary member 60 in the connecting body 30. Likewise, in a process that the electronic device switches from the first mode to the second mode through the arbitrary mode, a distance between the sixth end 22 of the second body 20 and the first surface 100 is maintained as smaller than the first predetermined threshold.

In addition, in the mode switching process shown in FIGS. 4A to 4C, an external force needs to be applied on the electronic device. Specifically, in the first mode shown in FIG. 4A, when an external force F that has a component in a direction from the sixth end 22 to the fifth end 21 is applied on the second body 20, and a magnitude of the component of the external force satisfies a first predetermined condition, the electronic device switches from the first mode to the second mode. Likewise, in the second mode shown in FIG. 4C, when an external force F that has a component in a direction from the fifth end 21 to the sixth end 22 is applied on the second body 20, and a magnitude of the component of the external force satisfies a first predetermined condition, the electronic device switches from the second mode to the first mode. As already described above with reference to FIGS. 2A to 2C and 3, the first predetermined condition may be larger than the second predetermined condition.

Figure 5:
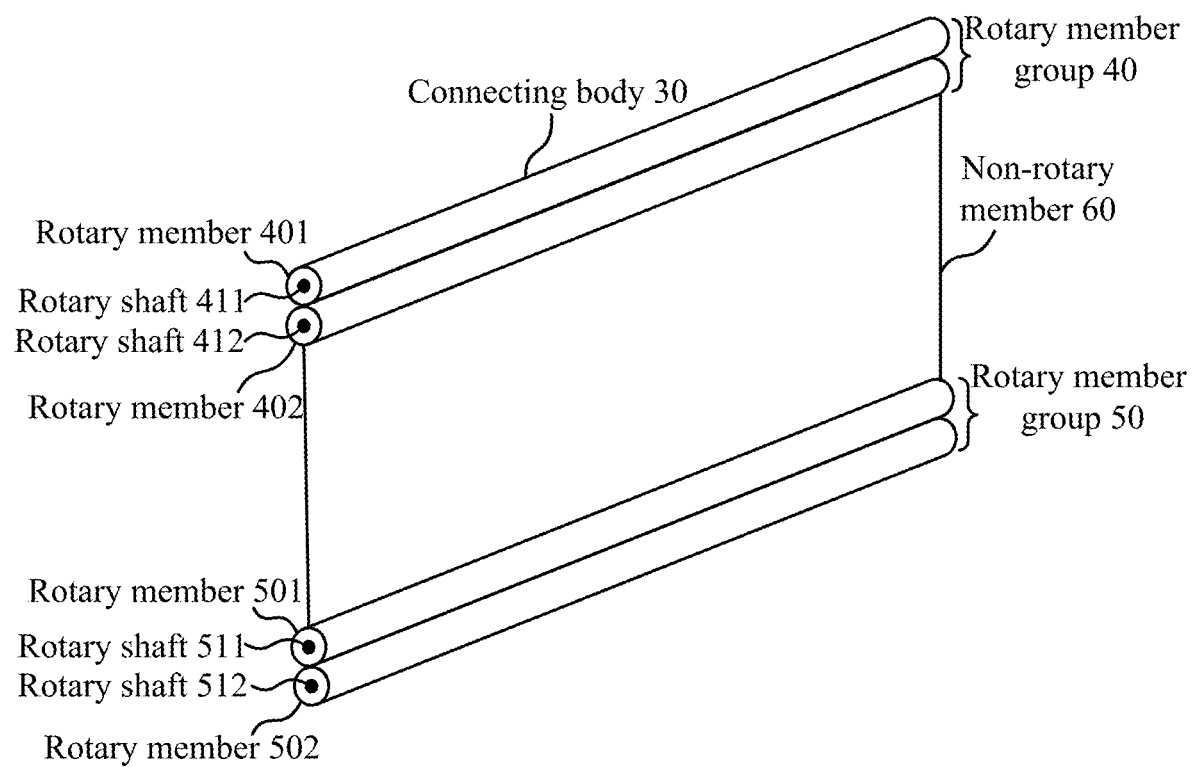
FIG. 5 is a schematic diagram further illustrating the connecting body according to the second embodiment of the present disclosure.

FIG. 5 is a schematic diagram further illustrating the connecting body according to the second embodiment of the present disclosure. As shown in FIG. 5, the connecting body 30 according to the second embodiment of the present disclosure comprises two rotary member groups 40 and 50 and at least one non-rotary member 60 between the two rotary member groups, each rotary member group 40 and 50 comprises at least two rotary members 401, 402, 501, 502. As described above, each of the at least two rotary members 401 and 402 (or 501 and 502) has a self-rotary shaft 411 and 412 (or 511 and 512), and respective self-rotary shafts 411 and 412 (or 511 and 512) of the at least two rotary members 401 and 402 (or 501 and 502) are parallel to each other. Likewise, for example, when an external force applied on one rotary member 401 is vertical to the self-rotary shaft 411 thereof and a magnitude of a component in a direction tangential to an outer surface of the one rotary member 401 satisfies a second predetermined condition, the one rotary member 401 can rotate around the self-rotary shaft 411 thereof. In addition, when there is no external force that satisfies the second predetermined condition on each of the rotary members of the two rotary member groups 40 and 50, the respective rotary members of the two rotary member groups 40 and 50 probably maintain a mutual stability due to the damping, so as to ensure the relative stable state between the first body 10, the second body 20, and the connecting body 30 of the electronic device 1.

Likewise, in an example of the second embodiment of the present disclosure, when one rotary member (e.g., rotary member 401 or 501) rotates, the other rotary members (rotary member 402 or 502) rotate accordingly. In addition, in another example of the second embodiment of the present disclosure, when the one rotary member (e.g., rotary member 401) rotates, the other rotary member 502 does not rotate. Different than that the connecting body 30 is totally composed by rotary members in the above first embodiment, since there is the non-rotary section 60 in the connecting body 30 of the second embodiment of the present disclosure, no matter the rotary members therein all rotate in linkage or there is a rotary member that does not rotate in linkage, the first body 10 and the second body 20, on the whole, do not maintain sliding in parallel in the whole mode switching process.

Figure 6A:
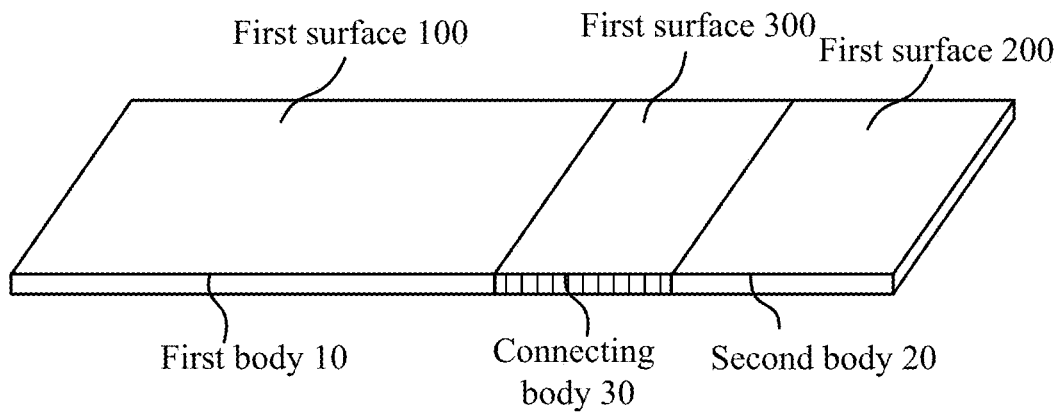
FIGS. 6A and 6B are schematic diagrams illustrating a third mode of the electronic device according to the first and second embodiments of the present disclosure.
Figure 6B:
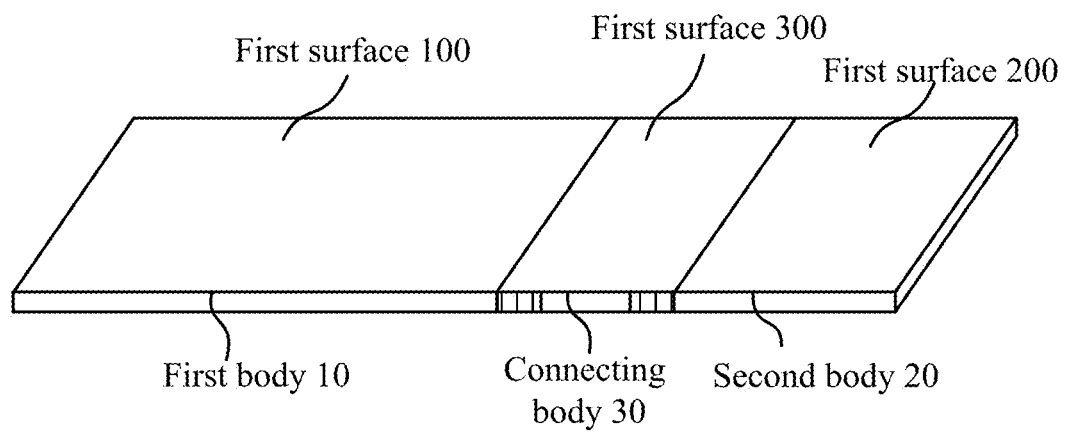

FIGS. 6A and 6B are schematic diagrams illustrating a third mode of the electronic device according to the first and second embodiments of the present disclosure. Specifically, FIG. 6A illustrates a case of the first embodiment where the connecting body 30 is composed by the at least three rotary members 301-30n, FIG. 6B illustrates a case of the second embodiment where the connecting body 30 comprises two rotary member groups 40 and 50 and at least one rotary member 60 between the two rotary member groups. As shown in FIGS. 6A and 6B, the electronic device further has a third mode, in which a first outer surface composed by the first surface 100 of the first body 10, the first surface 300 of the connecting body 30, and the first surface 200 of the second body 20 is flat or approximately flat. Specifically, thickness of the first body 10, thickness of the second body 20, and thickness of the connecting body 30 are strictly the same, and when the first body 10 and the connecting body 30, and the second body 20 and the connecting body 30 fully rotate relative to each other to reach that an angle there between is 180 degrees, the first external surface is flat. When thickness of the first body 10, thickness of the second body 20, and thickness of the connecting body 30 are different, or the first body 10 and the connecting body 30, and the second body 20 and the connecting body 30 do not fully rotate relative to each other, and an angle there between is less than 180 degrees (e.g., 175 to 180 degrees), the first external surface is approximately flat.

Figure 7A:
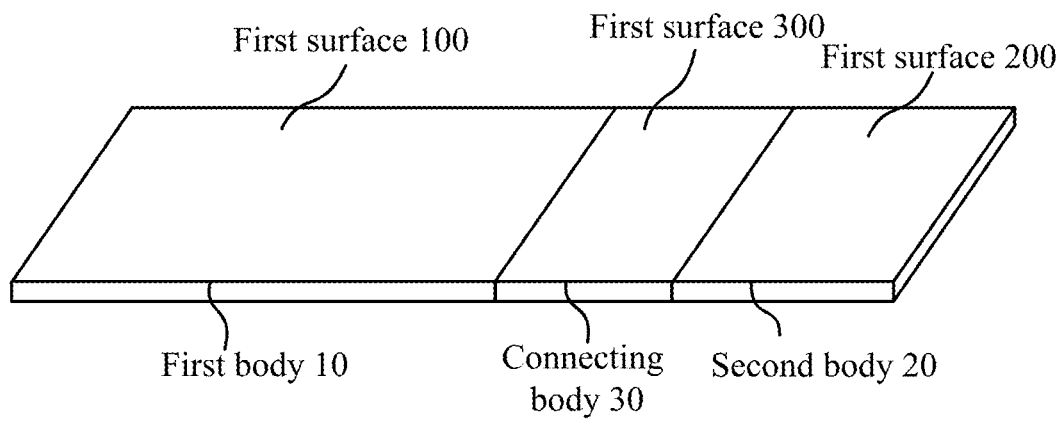
FIGS. 7A to 7C are schematic diagrams illustrating a switching process between the first mode and the third mode of the electronic device according to the embodiments of the present disclosure.
Figure 7B:
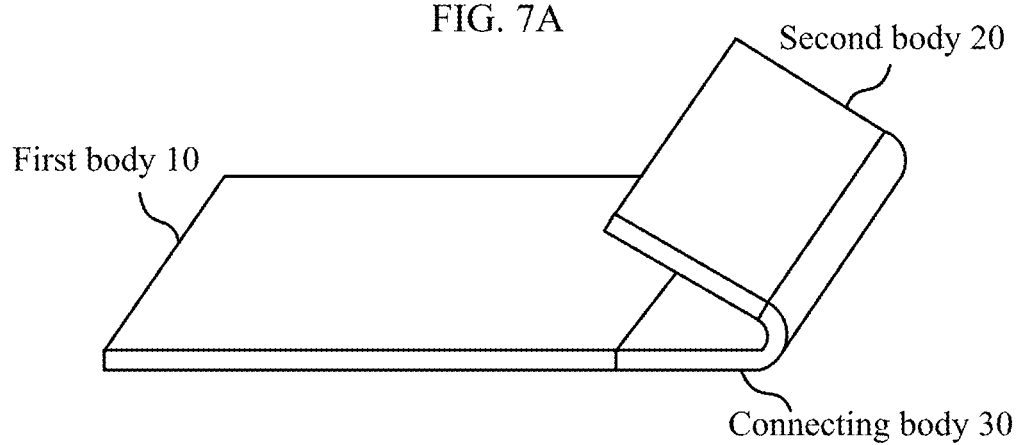
Figure 7C:
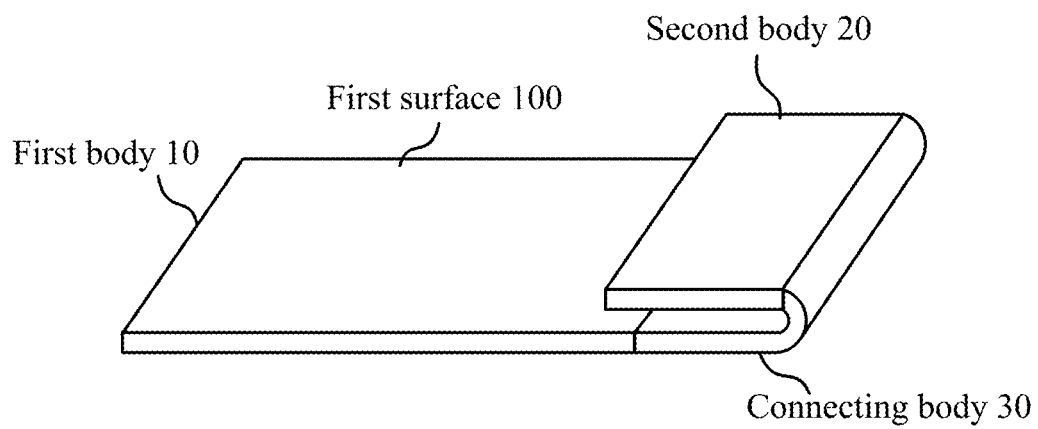

As described above, FIGS. 2A to 2C are schematic diagrams illustrating a switching process between a first mode and a second mode of the electronic device according to a first embodiment of the present disclosure, and FIGS. 4A to 4C are schematic diagrams illustrating a switching process between the first mode and the second mode of the electronic device according to a second embodiment of the present disclosure. It can be seen that, although in the first embodiment and the second embodiment, configuration of the connecting body 30 is different, the switching manner between the first mode and the second mode are the same. In addition, FIGS. 7A to 7C are schematic diagrams illustrating a switching process between the first mode and the third mode according to the first and second embodiments of the present disclosure. In FIGS. 7A to 7C, specific configuration of the connecting body 30 is not shown in particular, in other words, in FIGS. 7A to 7C, the connecting body 30 may adopt either the configuration in the first embodiment or the configuration in the second embodiment. Specifically, FIG. 7A illustrates the third mode of the electronic device of the present disclosure, FIG. 7C illustrates the first mode of the electronic device of the present disclosure, and FIG. 7B illustrates an arbitrary mode during the process of switching between the third mode and the first mode. From a comparison among FIGS. 2A to 2C, 4A to 4C, and 7A to 7C, it can be clearly seen that, the difference between the first manner and the second manner comprises: movement modes of the second body in the first manner and the second manner are different.

Hereinafter, different movement modes of the second body 20 in the first manner and the second manner will be explained from different perspectives.

First, it is possible to consider from the perspective of different ways of force acting.

The electronic device 1 may be made to switch between the second mode and the first mode with a first manner. In the second mode, with the first manner, an external force that has a component in the direction from the fifth end 21 to the sixth end 22 is applied on the second body 20, and a magnitude of the external force satisfies the second predetermined condition, that is, the external force is enough to make the second body 20 slide relative to the first body 10 through the connecting body 30, so that the electronic device switches from the second mode to the first mode. That is to say, in this case, with the first manner, the second body is acted upon by a push parallel to the first surface of the electronic device 1 and pointing from the fifth end 21 to the sixth end 22, in other words, the second body 20 is acted upon by a push for sliding in a direction of being close to the first body 10, so that the electronic device 1 switches from the second mode to the first mode. Of course, on the other hand, in the first mode, with the first manner, an external force that has a component in the direction from the sixth end 22 to the fifth end 21 is applied on the second body 20, and a magnitude of the external force satisfies the second predetermined condition, that is, the external force is enough to make the connecting body 30 move, so that the electronic device switches from the first mode to the second mode. That is to say, in this case, with the first manner, the second body is acted upon by a push parallel to the first surface of the electronic device 1 and pointing from the sixth end 22 to the fifth end 21, in other words, the second body 20 is acted upon by a push for sliding in a direction of being away from the first body 10, so that the electronic device 1 switches from the first mode to the second mode.

The electronic device 1 may be made to switch between the third mode and the first mode with the second manner. In the third mode, with the second manner, an external force that has a component in the rotary direction from the sixth end 22 to be close to the first surface of the first body is applied on the second body 20, and a magnitude of the external force satisfies a third predetermined condition, that is, the external force is enough to make the second body 20 rotate relative to the first body 10 through the connecting body 30, so that the electronic device switches from the third mode to the first mode. That is to say, in this case, with the second manner, the second body is acted upon by a push having a certain angle (for example, the angle is 90 degrees) with the first surface of the second body 20 and pointing from a rotary direction from the sixth end 22 to be close to the first surface of the first body 10, in other words, the second body 20 is acted upon by a push that rotates the second body 10 toward a direction of being close to the first surface of the first body 10, so that the electronic device 1 switches from the third mode to the first mode. Of course, on the other hand, in the third mode, with the second manner, an external force that has a component in the rotary direction from the sixth end 22 to be away from the first surface of the first body is applied on the second body 20, and a magnitude of the external force satisfies the third predetermined condition, that is, the external force is enough to make the second body 20 rotate relative to the first body 10 through the connecting body 30, so that the electronic device switches from the first mode to the third mode. That is to say, in this case, with the second manner, the second body 20 is acted upon by a push having a certain angle (for example, the angle is 90 degrees) with the first surface of the second body 20 and pointing from a rotary direction from the sixth end 22 to be away from the first surface of the first body 10, in other words, the second body 20 is acted upon by a push that rotates the second body 10 toward a direction of being away from the first surface of the first body 10, so that the electronic device 1 switches from the first mode to the third mode.

Second, it is possible to consider from the perspective of different movement directions.

The electronic device 1 may be made to switch between the second mode and the first mode with the first manner. In the second mode, with the first manner, the second body 20 and the first body 10 move relatively in parallel (in substance, totally parallel or approximately parallel), wherein an angle between the first body 10 and the second body 20 maintains constant and less than the second predetermined threshold, so that the electronic device 1 switches from the second mode to the first mode. For example, in the first embodiment, the second body 20 and the first body 10 move relatively in total parallel, so that the angle between the first body 10 and the second body 20 maintains constant and is zero. However, in the second embodiment, in an allowable range, the second body 20 and the first body 10 move relatively in approximate parallel, in this case, the angle between the first body 10 and the second body 20 maintains constant and is α, of course, α is a value smaller than the second predetermined threshold. On the other hand, in the first mode, with the first manner, the second body 20 and the first body 10 move relatively toward opposite directions, so that the electronic device 1 switches from the first mode to the second mode.

The electronic device 1 may be made to switch between the third mode and the first mode with the second manner. In the third mode, with the second manner, the second body 20 and the first body 10 rotate relatively, wherein the angle between the first body 10 and the second body 20 reduces continuously, so that the electronic device switches from the third mode to the first mode. On the other hand, in the third mode, with the second manner, the second body 20 and the first body 10 rotate relatively in directions opposite to each other, wherein the angle between the first body 10 and the second body 20 increases continuously, so that the electronic device switches from the first mode to the third mode.

Thereafter, it is also possible to consider from the perspective of different distances between the sixth end 22 and the first surface 100 of the first body 10 during a movement.

The electronic device 1 may be made to switch between the second mode and the first mode with the first manner. In the second mode, with the first manner, the second body 20 moves while maintaining the distance between the sixth end 22 and the first surface 100 of the first body 10 as smaller than the first predetermined threshold, so that the electronic device 1 switches from the second mode to the first mode. Of course, on the other hand, in the first mode, with the first manner, the second body 20 moves while maintaining the distance between the sixth end 22 and the first surface 100 of the first body 10 as smaller than the first predetermined threshold, so that the electronic device 1 switches from the first mode to the second mode. For example, the switching between the second mode and the first mode may be made with the first manner in a case where the body 20 and the first body 10 are in a complete fitting, in this case, the distance between the sixth end 22 and the first surface of the first body 10 is zero. Another example, it is also possible to make only the sixth end 22 of the second body 20 contact the first surface 100 of the first body 10 but the rest of the second body 20 does not contact, in this case, the distance between the sixth end 22 and the first surface of the first body 10 is a small value in an allowable range, that is, smaller than the first predetermined threshold.

The electronic device 1 may be made to switch between the third mode and the first mode with the second manner. In the third mode, with the second manner, the second body 20 moves while the distance between the sixth end 22 and the first surface of the first body 10 is made to increase from the second predetermined threshold to a maximum and then reduce to below the first predetermined threshold, so that the electronic device 1 switches from the third mode to the first mode. Specifically, in the third mode, if, as described above, the first surface 100 of the first body 10, the second surface 200 of the second body 10, and the third surface 300 of the third body 30 are in one plane strictly, then when switching from the third mode to the first mode with the second manner, first, the distance between the sixth end 22 and the first surface of the first body 10 is zero, that is, the second predetermined threshold is zero. Then, along that the second body rotates toward a direction of being close to the first body 10, the distance between the two increases gradually to the maximum, for example, the maximum is reached when the second body 20 and the first body 10 are vertical, thereafter, the distance between the two decreases gradually to the first predetermined threshold, that is, the minimum is reached when the second body 20 and the first body 10 are totally or essentially fitting. In the third mode, if, as described above, the first surface 100 of the first body 10, the second surface 200 of the second body 10, and the third surface 300 of the third body 10 are in one plane strictly, then when switching from the third mode to the first mode with the second manner, initially, the distance between the sixth end 22 and the first surface 100 of the first body 10 is a non-zero small value. On the other hand, in the first mode, with the second manner, the second body 20 moves while the distance between the sixth end 22 and the first surface 100 of the first body 10 is made to increase from below the first predetermined threshold to a maximum and then reduce to the second predetermined threshold, so that the electronic device 1 switches from the first mode to the third mode.

In the above, for convenience of understanding, differences between the first manner and the second manner for changing a mode are explained from three different angles. However, the present disclosure is not limited thereto. As will be appreciated by those skilled in the art, any other possible angles may also be used similarly to explain the differences between the first manner and the second manner.

Figure 8A:
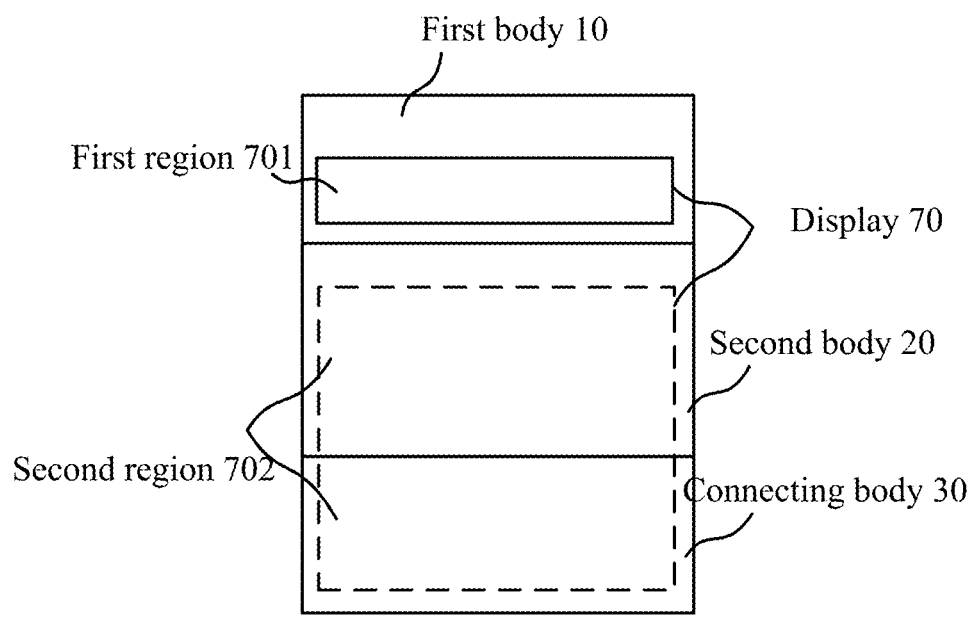
FIGS. 8A and 8B are schematic diagrams further illustrating the electronic device provided with a display.
Figure 8B:
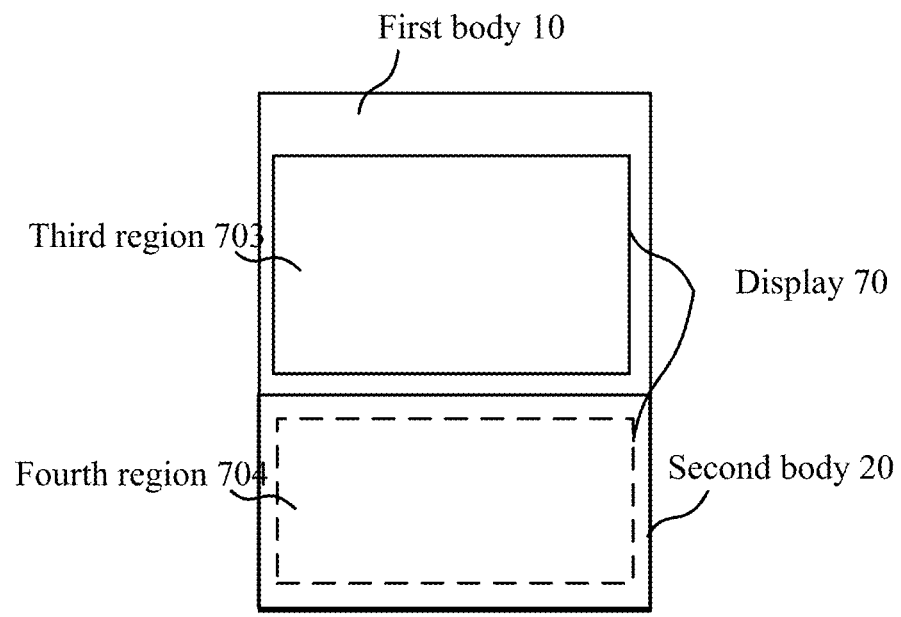

FIGS. 8A and 8B are schematic diagrams further illustrating the electronic device provided with a display. As shown in FIGS. 8A and 8B, the electronic device according to the first and second embodiments of the present disclosure further comprises a display 70 disposed at least on the first surface 100 of the first body 10. Further, as shown in FIGS. 8A and 8B, area of a first non-covered part 701 of the display 70 in the first mode is different than area of a second non-covered part 702 of the display 70 in the second mode.

As shown in FIG. 8A, in the first mode, a second region 702 (shown with dotted lines in FIG. 8A) of the display 70 cannot be perceived while the first region 701 of the display 70 can be perceived. The "cannot be perceived" may refer to that when the smart phone 1 in the first mode, a user of the electronic device cannot see or clearly see content displayed in the second region 702 of the display 70, or when the smart phone 1 in the first mode, a user of the smart phone 1 cannot touch the second region 702 of the display 40.

For example, in the first mode, the first region 701 of the display 70 is not covered by the second body 20, and the second region 702 of the display 70 is covered by the second body 20. In the first mode shown in FIG. 3, the second body 20 and the first body 10 are parallel, thus the second region 702 of the display 70 is totally covered by the second body 20, whereas the first region 701 of the display 70 is not covered by the second body 20. Since the second region 702 is covered by the second body 20, the user at least cannot touch the second region 702. It should be noted that, although FIG. 8A shows a case where the second region 702 is covered by the second body 20, those skilled in the art does not necessarily deduce that the display content in the second region 702 of the display 70 is invisible. For example, when the second body 20 is made from transparent material such as glass, transparent plastic, in the first mode shown in FIG. 8A, the user can still see display content in the second region 702 of the display 70 through the second body 20. Alternatively, when the second body 20 is made from translucent material such as translucent resin, the user can still see the display content in the second region 702 through the second body 20, but in this case, legibility of the display content in the second region 702 is not high.

For example, the connecting body 30 has a rotary shaft (not shown in FIG. 8A), and the first body 10 and the second body 20 have different lengths in a direction vertical to the rotary shaft. Assuming that a length of the first body 10 in a direction vertical to the rotary shaft is L1, a length of the second body 20 in a direction vertical to the rotary shaft is L2, and L1>L2. In this case, when the user rotates the second body 20 along the rotary shaft of the connecting body 30 relative to the first body, it is impossible for the second body 20 to totally cover the first body 10, that is, the user can perceive the first region 701 of the display 70.

It should be noted that, although it is shown in the above that the length L1 of the first body 10 is larger than the length L2 of the second body 20, the present disclosure is not limited thereto, the length L1 of the first body 10 may be smaller than the length L2 of the second body 20. In this case, since the connecting body 30 also has a certain length in a direction vertical to the rotary shaft, the second body 20 still can rotate relative to the first body 10 to cover a part of region of the first body 10, so that the user can perceive the first region 701 of the display 70. In addition, in this case, the user can finally effectuate a parallel or relatively parallel state between the first surface 100 of the first body 10 and the first surface 200 of the second body 20 in a manner of rotating the first body 10 along the rotary shaft of the connecting body 30 relative to the second body 20, so that a part of the display disposed on the second body 20 can be perceived.

In addition, it should be noted that, to better explain the first mode, FIG. 8A shows the second display region 702 as being covered by the second body 20 and the connecting body 30, however, those skilled in the art can deduce from the description and teaching of the embodiments described above that, the second region 702 may be covered only by the second body 20 but not covered by the connecting body 30. In addition, in this embodiment, it is also shown that the display 70 is disposed only on the first surface 100 of the first body 10, however, the present disclosure is not limited thereto, the display 70 may be disposed on the first surface 100 of the first body 10 and the third surface 300 of the third body 30, or disposed on a first outer surface (composed by the first surface 100 of the first body 10, the first surface 300 of the connecting body 30, and the first surface 200 of the second body 20) of the smart phone 1.

As shown in FIG. 8B, in the second mode, a third region 703 of the display 70 is not covered by the second body 20 and the fourth region 704 of the display 70 is covered by the second body 20. Similar to the first mode described above, since the fourth region 704 is covered by the second body 20, the user at least cannot touch the fourth region 704. Although FIG. 8B shows a case where the fourth region 704 is covered by the second body 20, those skilled in the art does not necessarily deduce that the display content in the fourth region 704 of the display 70 is invisible. For example, when the second body 20 is made from transparent material such as glass, transparent plastic, the user can still see display content in the fourth region 704 of the display 70 through the second body 20. As shown in FIG. 8B, since the region of the first body 10 covered by the second body 20 in the second mode is smaller than that in the first mode, the third region 703 of the display 70 is bigger than the first region 701.

Although in the case described with reference to FIGS. 8A and 8B, the third region 703 of the display 70 is larger than the first region 701, the present disclosure is not limited thereto, the third region 703 may be smaller than the first region 701. For example, as described above, in the case where the length L1 of the first body 10 is smaller than the length L2 of the second body 20, when the user rotates the first body 10 and makes it cover the second body 20, since the first body 10 cannot totally cover the second body 20, a part of region of the display disposed on the second body 20 can be perceived, such part of region of the display may be regarded as the third region, and the third region may be smaller than the first region 701 in appropriate circumstances.

In addition, it should be also noted that, to better explain the second mode, FIG. 8B shows the fourth region 704 as being covered only by the second body 20, however, those skilled in the art can deduce form the description and teaching of the embodiments described above that, the fourth region 704 may be covered by the connecting body 30 (i.e., covered by the second body 20 and the connecting body 30). In addition, as described above, the display 70 may be disposed on the first surface 100 of the first body 10 and the first surface 300 of the third body 30, or disposed on a first outer surface of the electronic device 1.

Furthermore, as shown in FIGS. 8A and 8B, the display 70 is a deformable display, the display 70 is disposed at least in a region formed by the first surface 100 of the first body 10 and the first surface 200 of the second body 20; or the display 70 is disposed in a region formed by the first surface 100 of the first body 10, the first surface 300 of the connecting body 30, and the first surface 200 of the second body 20. In the first mode and the second mode described with reference to FIGS. 2A to 2C and 4A to 4C, one part of the display 70 covers another part of the display 70.

In addition, the electronic device according to the embodiment of the present disclosure further includes a first input unit (not shown) disposed at least in a second surface of the second part. Herein, the second surface is a surface opposite to the first surface described above. That is to say, generally, the first surface is the front surface (surface on which the display locates) of the electronic device 1, and the second surface is the back surface of the electronic device 1. It should be noted that, although the first input unit can be set on partial region of the second surface of the second body, it also can be set on the entire region of the second surface of the second body. The first input unit may be for example a touch controller, like a touch panel. Specifically, in the first example, the first input unit may be disposed in only second surface of the second body. In the second example, the first input unit may be disposed at least in a part of the second surface of the second body and the second surface of the connecting body. In other words, the first input unit may be disposed across two bodies: the first body and the connecting body. In the third example, the first input unit may be disposed in the second surface of the first body, the second surface of the connecting body, and the second surface of the second body. In other words, the first input unit may be disposed across three bodies: the first body, the connecting body, and the second body.

Likewise, it should be noted that, in the case where the first input unit is disposed across two bodies or three bodies, the first input unit may comprise corresponding two or three touch panels, or the first input unit may comprise only a whole piece of touch panel.

In addition, optionally, the electronic device may further comprise: a second display (not shown) disposed at least in the second surface of the second body. Similarly, the second display may be disposed only in the second surface of the second body, or disposed in the second surface of the first body and the second surface of the first connecting body, or disposed in second body of the first body, the second surface of the connecting body, and the second surface of the second body.

It should be noted that, no matter it is disposed in which way, the first input and the second display disposed on the second surface of the second body may be set in a stacked manner. That is to say, in the case that the first input unit is a touch controller, it is possible to set a touch display on the second surface of the second body.

In addition, optionally, the electronic device may further comprise: a second input unit disposed at least in the first surface of the first body. Similarly, the second input unit may be disposed only in the first surface of the first body, or disposed in the first surface of the first body and the first surface of the connecting body, or disposed in first surface of the first body, the first surface of the connecting body, and the first surface of the second body.

Also, it should be noted that, no matter it is disposed in which way, the second input unit disposed on the first surface of the first body and the display 70 described above may be set in a stacked manner. That is to say, in the case that the second input unit is a touch controller, it is possible to set a touch display on the first surface of the first body. And it should be noted that, when the second input unit and the display 70 are set in a stacked manner, the display 70 will not affect acquisition and input of the second input unit, the second input unit will not affect the display 70 being perceived by the viewer.

Figure 9A:
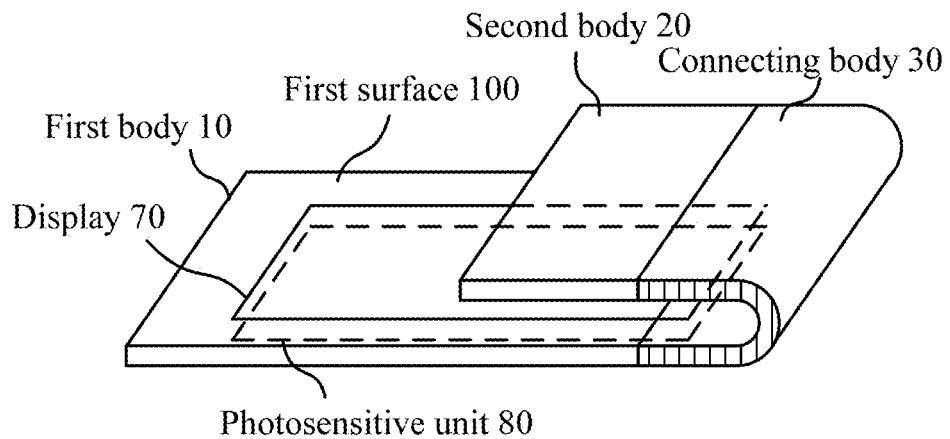
FIGS. 9A and 9B are schematic diagrams further illustrating the electronic device provided with a sensor.
Figure 9B:
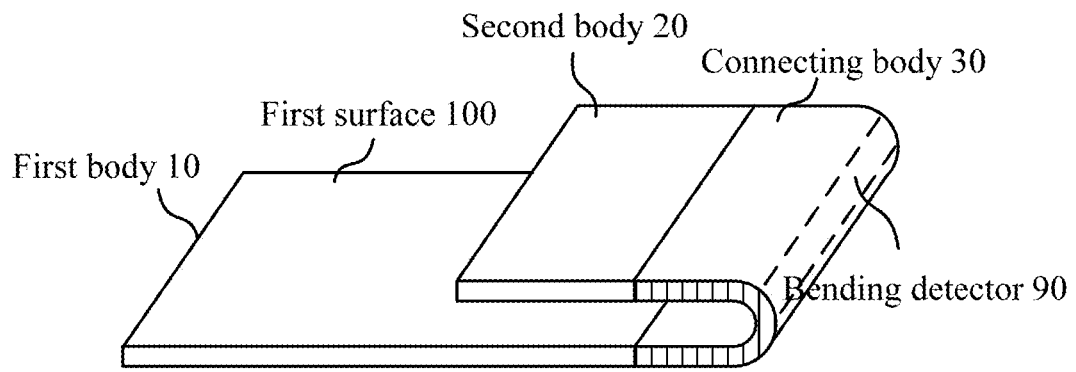

FIGS. 9A and 9B are schematic diagrams further illustrating the electronic device provided with a sensor. As described above with reference to FIGS. 1 to 8B, the electronic device according to the embodiments of the present disclosure have multiple different operating modes (such as the first mode, the second mode, and the third mode), and as shown in FIGS. 8A and 8B, in different operating modes, the display 70 disposed on the electronic device will be covered differently, thus there are different exposed regions. Therefore, multiple different operating modes of the electronic device may correspond to different operating modes, and different display content may be provided to the display 70 according to different operating modes.

Therefore, the electronic device may further comprise a sensor (not shown) disposed in the first body 10 and/or the connecting body 30 and/or the second body 20, and configured to detect a mode switching and/or a mode switching manner of the electronic device; and a processor (not shown) disposed in the first body 10 and/or the connecting body 30 and/or the second body 20, and configured to control a mode switching of the electronic device according to a posture switching and/or a posture switching manner detected by the sensor.

Specifically, in an embodiment of the present disclosure, as shown in FIG. 9A, the sensor comprises a photosensitive unit 80, the photosensitive unit 80 comprises a light detecting array disposed corresponding to a light emitting array of the display 70, and is configured to determine an exposed region of the display according to a region that satisfies a predetermined luminance threshold in the light detecting array, so as to determine a mode of the electronic device. This is because in different modes of the electronic device, the display is differently covered by the connecting body 30 and/or the second body 20, and thereby has a different exposed region. Only the part disposed under the outer region of the light detecting array will sense entry of light that satisfies the predetermined luminance threshold, and the light sensed by the other covered part of the light detecting array does not satisfy the predetermined luminance threshold. Therefore, the part that detects the light that satisfies the predetermined luminance threshold of the light detecting array corresponds to an exposed region of the display 70 in a current mode.

In addition, the photosensitive unit 80 may further determine whether a size of the part sensing the light that satisfies the predetermined luminance threshold of the light detecting array increases gradually or sharply. If the photosensitive unit 80 determines a size of the part sensing the light that satisfies the predetermined luminance threshold of the light detecting array increases gradually, it should be determined that mode is switched with the first manner. On the other hand, if the photosensitive unit determines size of the part sensing the light that satisfies the predetermined luminance threshold of the light detecting array increases sharply, it should be determined that mode is switched with the second manner.

In another embodiment of the present disclosure, as shown in FIG. 9B, the sensor comprises a bending detector 90 disposed in the connecting body 30 and configured to determine a mode of the electronic device according to a state of the connecting body 30. For example, the bending detector 90 may be an angle sensor that senses a current bending angle of the connecting body 30. By setting specific dimensions of the first body 10, the connecting body 30, and the second body 20 in advance, after the current bending angle of the connecting body 30 is sensed, it is possible to thereby determine a current mode of the electronic device.

In addition, the bending detector 90 may further detect rotation of the rotary shafts comprised in the connecting body 30. Specifically, as described above, the connecting body 30 may comprise multiple rotary shafts. For example, if the bending detector 90 detects that only some rotary shafts among the multiple rotary shafts rotate while the others do not, and the rotary shafts that rotate change in sequence (e.g., 311, 312, 313 at a current moment, 312, 313, 314 in a next moment), then it should be determined that mode is switched with the first manner. On the other hand, if the bending detector 90 detects that all rotary shafts among the multiple rotary shafts rotate, then it should be determined that mode is switched with the second manner.

In addition, in an embodiment of the present disclosure, the processor comprises a display control sub-processor (not shown), which switches display content on the display according to a mode switching of the electronic device, and thereby adaptively provides the user with a display that best suits a current mode of the electronic device.

For example, in the first mode, the processor can respond to an input of the first input unit through an instruction in a first instruction set. In the second mode, the processor can respond to an input of the first input unit through an instruction in a second instruction set. The first instruction set and the second instruction set are at least partially different. When the electronic device is in the third mode, it responds to an input of the first input unit through an instruction in a third instruction set.

Specifically, the display control sub-processor is configured to control a change of display content on the first display in response to an input to first input unit.

More specifically, in the first mode, the display control sub-processor may change display content on the first display in response to a slide input operation on the first input unit. On the other hand, in the second mode, the display control sub-processor can determine a corresponding character in response to a click input operation on the first input unit, and display the character on the first display.

Figure 12A:
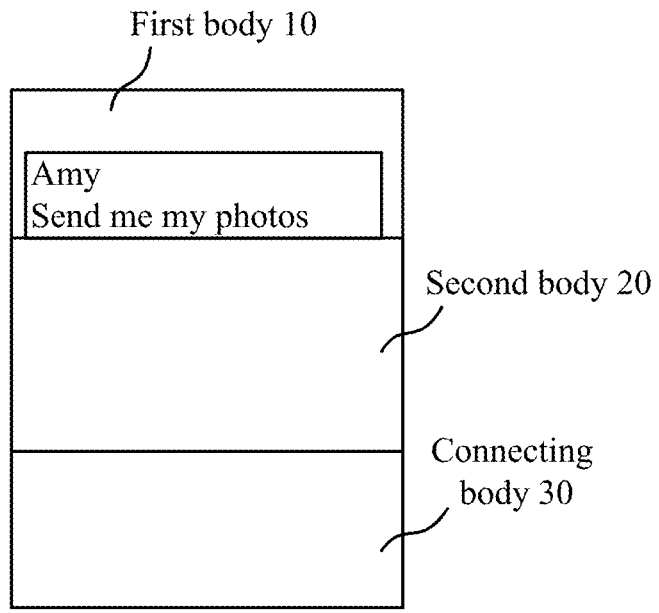
FIGS. 12A to 12C are schematic diagrams illustrating displaying of the electronic device according to the embodiment of the present disclosure in different modes.
Figure 12B:
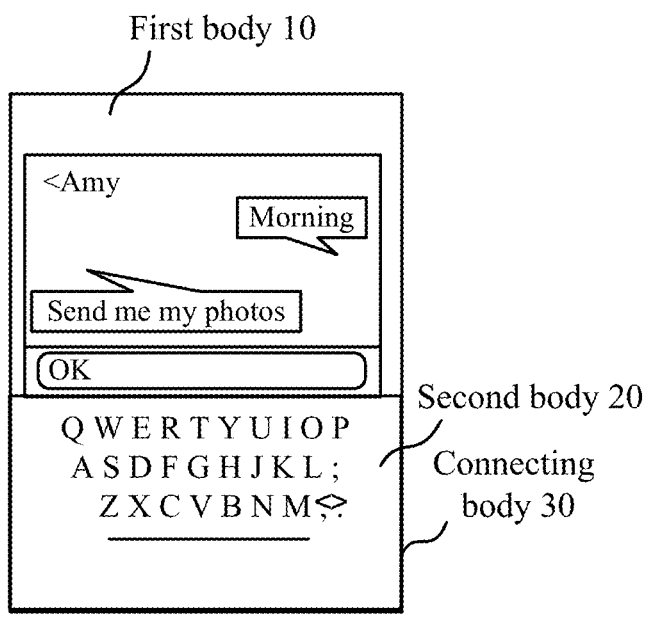

FIGS. 12A and 12B are schematic diagrams illustrating operating manners and display content of the electronic device according to the embodiment of the present disclosure in different modes.

As shown in FIG. 12A, the electronic device is in a first mode. In the first mode, a first non-covered part of the first display and the first input unit face the same direction. And the first non-covered part has relatively small area. In this first mode, a display content is displayed on the display 70. In this case, if an operation of a first manner (such as a slide input operation) is received through the first input unit, then the display control sub-processor correspondingly changes the displaying of the display 70 through an instruction in the first instruction set in response to the slide input operation. For example, when the display content is a first notifying message, the display controller can switch the first notifying message to a second notifying message in response to the slide input operation.

In addition, optionally, in the first mode shown in FIG. 12A, if an operation of a second manner (such as a click input operation) different than the first manner is received through the first input unit, then the processor may make no processing.

As shown in FIG. 12B, the electronic device is in the second mode. In the second mode, a second non-covered part of the display 70 and the first input unit face the same direction. And the second non-covered part has relatively large area. In this second mode, display content displayed on the display 70 is more than that displayed on the display 70 in the first mode as shown in FIG. 12A, and information amount is larger. In this case, if an operation of a second manner (such as a click input operation) is received through the first input unit, then the display control sub-processor correspondingly changes the displaying of the second display through an instruction in the second instruction set in response to the click input operation.

In addition, in the case where a second display is also disposed in the second surface of the second body to form a touch display, a character array may be displayed on the touch display, and each position of the character array indicates a corresponding input character when the user performs a touch input. Specifically, in FIG. 12B, illustration is made with the character array being a virtual keyboard as an example. In this case, if a click input operation on the virtual keyboard is received through the touch display, then the display control sub-processor can determine a corresponding character, and the character is displayed in the display 70. That is to say, in the second mode, the user can perform an input operation like character editing.

In addition, optionally, in the second mode shown in FIG. 12B, if an operation of a first manner (such as a slide input operation) different from the second manner is received through the first input unit, since the second instruction set may comprise no instruction corresponding to the operation of the first manner, then the processor may make no processing.

As will be appreciated by those skilled in the art, although description is provided above with operations of two different manners, slide input operation and click input operation, as examples, the present disclosure is not limited thereto. Instead, in the electronic device according to the embodiment of the present disclosure, the first input unit can receive different manners of input operations in different modes, and the processor can respond through instructions in different instruction sets. In addition, in the case where the first input unit and the optional second display form a touch display in a stacked way, in the first mode, the second display may be disabled, so that the touch display serves as only a touch panel, thus saving power of the electronic device. In the second mode, the second display can display content corresponding to an operation manner of the second mode, such as a virtual keyboard etc., so that it assists in user input. That is to say, the touch display supports a different function in a different mode.

Specifically, in the first example, as described above, the sensor detects a parameter indicating a mode of the electronic device. As long as the sensor detects that the mode of the electronic device changes, the processor accordingly changes a responding mode to an input of the first input unit. For example, as long as the sensor detects that the electronic device switches to the second mode, the processor accordingly changes a responding mode to an input of the first input unit, for example, it responds through an instruction in the second instruction set. Further, if the second display is disabled in the former mode, the processor may trigger to enable the second display.

In the second example, as described above, the electronic device may have the first mode, the second mode, and the third mode. When the sensor detects that the mode of the electronic device changes, the processor determines whether the mode before change is a specified mode. Only when the electronic device changes from a specified mode to another mode, the processor accordingly changes a responding mode to an input of the first input unit. For example, only when the electronic device switches from the first mode to the second mode, the processor accordingly changes a responding mode to an input of the first input unit, for example, it responds through an instruction in the second instruction set. Further, if the second display is disabled in the former mode, the processor may trigger to enable the second display.

In the third example, when the sensor detects that the mode of the electronic device changes, the processor further determines whether a specific application is running on the electronic device in the mode before change occurs. Only when a specific application is running on the electronic device in the mode before change occurs, the processor accordingly changes a responding mode to an input of the first input unit. For example, only when the electronic device switches from a certain mode to the second mode and an application that supports character input is running in the mode before change occurs, the processor accordingly changes a responding mode to an input of the first input unit, for example, it responds through an instruction in the second instruction set. Further, if the second display is disabled in the former mode, the processor may trigger to enable the second display.

In addition, the display control sub-processor is used for controlling to display a third interface in a fifth region in the third mode. Wherein, the fifth region is a region which can be perceived by the viewer in the display in the third mode. The third interface comprises at least a first sub-interface and a second sub-interface. In addition, the display control sub-processor is further used for controlling to display a second interface in the third region in the second mode, wherein the second interface comprises only a third sub-interface. Wherein, the third region is a region which can be perceived by the viewer in the display in the second mode. And, the fifth region is larger than the third region. In other words, different from the third interface that comprises at least two sub-interfaces, the second interface is composed by a single sub-interface. The second interface and the third interface will be described in detail later with reference to specific examples.

In response to a trigger signal generated by the sensor and indicating that the electronic device switches from the second mode to the third mode, the display control sub-processor switches the display of the display from the second interface to the third interface, or in response to a trigger signal indicating that the electronic device switches from the third mode to the second mode, the display control sub-processor switches the display of the display from the third interface to the second interface.

Different scenarios of the electronic device in the embodiment of the present disclosure will be described in detail below.

In a first scenario, the electronic device is in the second mode, and the second interface is displayed in the third region of the display. The second interface is a chat interface of a chat application. When the sensor detects that the electronic device changes from the second mode to the third mode, the display control sub-processor correspondingly switches the second interface to the third interface. The third interface is another interface of the chat application different than the chat interface, such as a sharing interface that displays a map and shares location. The sharing interface may have a first sub-interface and a second sub-interface. The first sub-interface is, for example, an operation region to join in and quit from sharing. The second sub-interface is, for example, a shared region where shared content is displayed. That is to say, in the first scenario, in the second mode, a first invoked interface of a certain application is displayed. When the electronic device switches from the second mode to the third mode, a second invoked interface of the same application different from the first invoked interface is displayed. Accordingly, the user can conveniently switch between multiple interfaces of an application, and make full use of various functions of the application, which improves user experience.

In a second scenario, the electronic device is in the second mode, and the second interface is displayed in the third region of the display. The second interface is a chat interface of a chat application. When the sensor detects that the electronic device changes from the second mode to the third mode, the display control sub-processor correspondingly switches the second interface to the third interface. The third interface is another interface of the chat application, such as an extended chat interface. The extended chat interface may have a first sub-interface and a second sub-interface. The first sub-interface, for example, corresponds to a chat interface in the second mode. The second sub-interface is, for example, a shared interface for sharing. That is, in the second scenario, in the second mode, a first invoked interface of a certain application is displayed. When the electronic device switches from the second mode to the third mode, a second invoked interface of the same application is displayed, and the first sub-interface in the second invoked interface corresponds to the first invoked interface. Accordingly, the user can conveniently switch between multiple interfaces of an application, the interfaces before and after the switching have a functional continuity, which improves user experience.

In a third scenario, the electronic device is in the second mode, and the second interface is displayed in the third region of the display. The second interface is a chat interface of a chat application. When the sensor detects that the electronic device changes from the second mode to the third mode, the display control sub-processor correspondingly switches the second interface to the third interface. The third interface is an interface of another application different than the chat application, such as an interface of a navigation application. The interface of the navigation application may have a first sub-interface and a second sub-interface. The first sub-interface is, for example, a real view navigation interface. The second sub-interface is, for example, a planar map navigation interface. That is to say, in the third scenario, in the second mode, a first invoked interface of a certain application is displayed. When the electronic device switches from the second mode to the third mode, a second invoked interface of a different application is displayed. Accordingly, the user can conveniently switch between multiple applications without exiting an application, which improves user experience.

In a fourth scenario, the electronic device is in the second mode, and the second interface is displayed in the third region of the display. The second interface is a chat interface of a chat application. When the sensor detects that the electronic device changes from the second mode to the third mode, the display control sub-processor correspondingly switches the second interface to the third interface. The third interface has a first sub-interface and a second sub-interface. The first sub-interface is, for example, an interface of another application different than the chat application, such as a navigation interface. The second sub-interface is, for example, an interface of yet another application different than the chat application, such as memo interface. That is, in the fourth scenario, in the second mode, a first invoked interface of a certain application is displayed. When the electronic device switches from the second mode to the third mode, a second invoked interface comprising application interfaces of two applications different than the aforesaid application is displayed. Accordingly, the user can conveniently switch between multiple applications without exiting an application, which improves user experience.

It should be noted that, in the above, the aforesaid several scenarios are described with switching from the second mode to the third mode as an example. As will be appreciated by those skilled in the art, the above scenarios may be also applied to the case of switching from the third mode to the second mode.

In addition, should be noted that, in the various scenarios described above, layout, display direction, and size of respective interfaces may be designed in various ways.

In the first example, layout between the first sub-interface and the second sub-interface may be designed as follows. Specifically, when the electronic device switches from the second mode to the third mode, the display controller can control to display the first sub-interface in the third region to which second mode corresponds, and display the second sub-interface in the region other than the third region in the fifth region. This is especially advantageous to the second scenario described above. That is to say, not only the interfaces before and after the switching have a functional continuity, but also the interfaces before and after the switching have a displaying continuity, which further improves user experience.

In the second example, a display direction of the display interface may be determined with reference to a mode of the electronic device. That is to say, even if the electronic device comprises a sensor like a gravity sensor and has the function of adaptively changing a display direction, it is also possible to determine whether to enable this function according to a mode of the electronic device. Specifically, in this example, the electronic device may further comprise a second sensor configured to sense a spatial movement parameter of the electronic device. The second sensor is, for example, a gravity sensor, an acceleration sensor and other sensors. The spatial movement parameter is, for example, an acceleration of the electronic device and other parameters. When the electronic device is in the second mode, the display control sub-processor does not respond to the spatial movement parameter to change the direction of the second interface. On the other hand, when the electronic device is in the third mode, the display control sub-processor responds to the spatial movement parameter to change the display direction of the third interface. That is to say, in this example, when the electronic device is in the second mode, the display direction of the electronic device is "locked", and it may also be understood as that the function that the electronic device adaptively changes the display direction according to the spatial movement parameter is disabled. When the electronic device is in the third mode, the display direction of the electronic device is not "locked", and it may also be understood as that the function that the electronic device adaptively changes the display direction according to the spatial movement parameter is enabled.

In a third example, on the basis of the second example described above, the electronic device may further determine layout of the first sub-interface and the second sub-interface in the third mode according to the spatial movement parameter. Specifically, in this example, in the third mode, the processor, in response to a first spatial movement parameter indicating that the electronic device is vertical, displays the first sub-interface and the second sub-interface as vertically arranged; the processor, in response to a second spatial movement parameter indicating that the electronic device is horizontal, displays the first sub-interface and the second sub-interface as horizontally arranged. Accordingly, layout of the first sub-interface and the second sub-interface in the third mode can be controlled according to the spatial movement parameter of the electronic device, to make it better meet the user's habits, which improves user experience.

In addition, as described above, the electronic device further comprises: a first input unit disposed at least in a second surface of the second part; a second display disposed at least in a second surface of the second body; wherein the first input unit and second display disposed at least in a second surface of the second part are set a stacked manner. In the second mode, a character array (e.g., a virtual keyboard) is displayed on the second display, each position of the character array indicates a corresponding input character when the user performs a touch input, the processor determines a corresponding character in response to a click input operation on the first input unit, and the character is displayed in the second interface. Accordingly, in the second mode, the user can conveniently perform a character input operation in a case where the display direction of the electronic device is "locked", thereby increasing input efficiency, which improves user experience.

As shown in FIG. 12B, the electronic device is in the second mode. In the second mode, a surface composed by the first surface of the first body and the first surface of the connecting body is covered by the second body, and the second non-covered part of the first body corresponds to the third region. Chat interface of a chat application is displayed on the third region.

In addition, in the case where a second display is also disposed in the second surface of the second body to form a touch display, as shown in FIG. 12B, a character array (e.g., virtual keyboard) may be displayed on the touch display, and each position of the character array indicates a corresponding input character when the user performs a touch input. In this case, if a click input operation on the virtual keyboard is received through the touch display, then the display control sub-processor can determine a corresponding character, and the character is displayed in the display 70. That is to say, in the second mode, the user can perform an input operation like character editing.

Figure 12C:
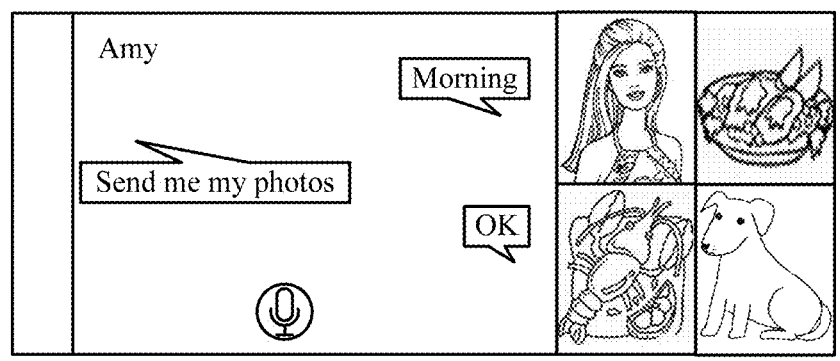

At this time, if the sensor detects that the electronic device switches from the second mode to the third mode and corresponding trigger signal is generated, then the display control sub-processor switches the second interface to the third interface in response to the trigger signal, as shown in FIG. 12C. In FIG. 12C, the electronic device not only changes from the second mode to the third mode, but also changes from vertical direction to the horizontal direction. Thereby, the third interface including a first sub-interface and a second sub-interface is displayed on the fifth region, and the third interface is displayed in the horizontal direction, wherein the first sub-interface and the second sub-interface are arranged horizontally.

Figure 13:
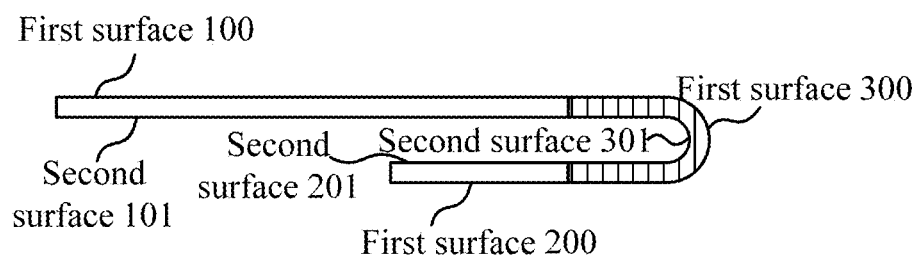
FIG. 13 is a schematic diagram of a fourth mode of electronic device according to the present disclosure.
Figure 14:
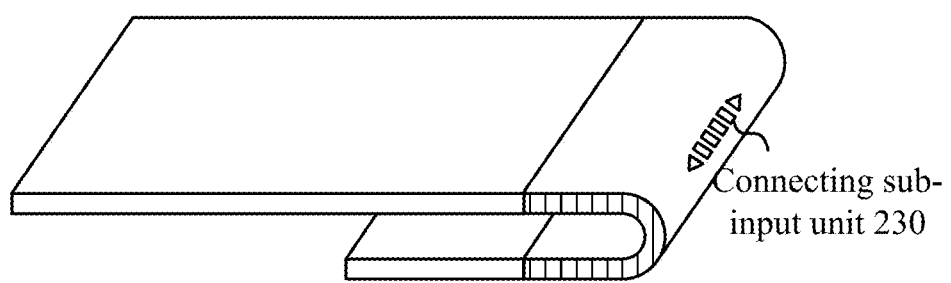
FIG. 14 is a schematic of a connecting sub-input unit of the electronic device according to the present disclosure.

Three modes of the electronic device 1 are described hereinabove. However, the present disclosure is not limited thereto. The electronic device 1 also can have a fourth mode. FIG. 13 is a perspective view of the fourth mode of electronic device according to the present disclosure. As shown in FIG. 13, in the fourth mode, the second surface 110 of the first body 10 and the second surface 210 of the second body 20 are opposite. Specifically, the fourth mode may be that the second surface 210 of the second body 20 and the second surface 110 of the first body 10 contact, and may be also that a distance between the second surface 210 of the second body 20 and the second surface 110 of the first body 10 is less than a predetermined threshold. When the electronic device is in the fourth mode, an input acquired by the second input unit is responded according to an instruction in the fourth instruction set. The second input unit can include a first sub-input unit, a second sub-input unit and a connecting sub-input unit. The connecting body 30 comprises a connecting sub-input unit (not shown) configured to acquire a user input operation. For example, the second body 20 and the first body 10 may also have a first sub-input unit (not shown) and a second sub-input unit (not shown), respectively. The fourth instruction set may be instructions that make the connecting sub-input unit to acquire instructions independently from the first sub-input unit and the second sub-input unit. As an example, display of the first sub-display and/or the second sub-display may be controlled in response to an input acquired by the connecting sub-input unit. Wherein, the first surface of the first body 10 can include the first sub-display, the first surface of the connecting body 30 can include the connecting sub-display, and the first surface of the second body 20 also can include the second sub-display. For example, during a video playback function of the electronic device 1, it is possible to slide the connecting sub-input unit to adjust the volume; during an image display function, it is possible to slide the connecting sub-input unit to zoom in or zoom out a picture; during an electronic book reading function, it is possible to slide the connecting sub-input unit to control page turning, etc. FIG. 14 is a perspective view of a connecting sub-input unit of the electronic device according to the present disclosure. As shown in FIG. 14, when the electronic device 1 is in the fourth mode, the connecting part is bent so that a first surface facing the user will form a thin strip region along the direction of rotary shaft. In this case, the connecting input unit 230 for example comprises a touch sensor, and the processor of the electronic device determines an input of the touch sensor, and when a determination result indicates that the input is a slide input along the direction of the rotary shaft, various processing described above are to be executed. In this way, it is possible to identify a slide input along the direction of the rotary shaft, thus avoiding an error operation.

For example, in one example of the present disclosure, when the electronic device according to the first embodiment of the present disclosure as shown in FIG. 2A to 2C is in the switching process between the first mode and the second mode or the electronic device according to the second embodiment of the present disclosure as shown in FIG. 4A to 4C is in the switching process between the first mode and the second mode, as shown in FIG. 8A to 8C, in different modes, the displaying 70 disposed on the electronic device will be covered differently, thereby there are different exposed regions with different size. Specifically, as shown in FIG. 8A, in the first mode, the electronic device can have a smaller exposed region 701. When the display 70 cannot be controlled regionally or be gradually lighted regionally, when the sensor detects that the electronic device is in the switching procedure from the first mode to the second mode, for example, when the sensor 80 as shown in FIG. 9A senses that the regions of the light detecting array which satisfy the predetermined luminance threshold are increasing or the bending detector 90 as shown in FIG. 9B senses that the bending angle of the connecting body 30 has changed, the display control sub-processor can control the display content of the display 70 not to change, that is to say, in the entire mode switching procedure, the display control sub-processor can control the display 70 to maintain only the lightening of the display region 701, and the display content only exists in the display region 701. When the sensor detects that the entire mode switching procedure has been ended, i.e., after the electronic device has come into the second mode, at this time, the electronic device has a larger exposed region 702, then the display control sub-processor controls the display 70 to light the entire exposed region 702 integrally, and richer comprehensive interface content is displayed on the entire display region 702. In one example of the present disclosure, after predetermined time period since the sensor detects that the entire mode switching procedure has been ended, i.e., when the sensor detects that the electronic device comes into the second mode and maintains for predetermined time period, the display control sub-processor controls the display 70 to light the entire exposed region 702 integrally and display is performed on the entire display region 702. The predetermined time period can be set by default, or can be set by user depending on need. For example, generally, the predetermined time period can be set to 1 s.

Similarly, when the sensor detects that the electronic device is switching from the second mode to the first mode, the display control sub-processor can first control the display content of the display 70 not to change, i.e., in the entire mode switching procedure, the display control sub-processor controls the display 70 to maintain the lightening of the whole display region 702, and display content exists in the entire display region 702. When the sensor detects that the entire mode switching procedure has been ended, i.e., after the electronic device comes into the first mode, the electronic device only has a smaller exposed region 701. At this time, the display control sub-processor can control the display 70 to only light the exposed region 701, and only simple information and/or instant information are displayed in the display region 701. In one example of the present disclosure, after predetermined time period since the sensor detects that the entire mode switching procedure has been ended, i.e., when the electronic device comes into the second mode and maintains for predetermined time period, the display control sub-processor controls the lightening region of the display 70 to be changed to a smaller exposed region 701, and only simple information and/or instant information are displayed in the display region 701.

In another example of the present disclosure, the display 70 of the electronic device 1 can also have the function of displaying content regionally and gradually lightening regionally by the control of the display control sub-processor. In this case, when the sensor 80 as shown in FIG. 9A senses that the regions of the light detecting array which satisfy the predetermined luminance threshold are increasing or when the bending detector 90 senses that the bending angle of the connecting body 30 has changed, the increased area of the exposed region of the display of the first body 10 can be computed based on the position of the part of the light detecting array which satisfy the predetermined luminance threshold detected by the light sensor 80 or the specific dimensions of the first body 10, the connecting body 30 and the second body 20 as well as the current bending angle of the connecting body 30. Whenever the sensor detects that the exposed region of the display of the first body increases by predetermined area, the display control sub-processor can control the display 70 of the first body to light the current exposed region of the display 70, and the display control sub-processor can control the display content of the display 70 to be gradually rich with the increase of the area of the exposed region of the display 70. When the sensor detects that the entire mode switching procedure has been ended, i.e., when the electronic device comes into the second mode, the display control sub-processor controls the display 70 to light the entire exposed region 702 integrally, and the interface content is displayed in the entire display region 702. Wherein, the predetermined area can be set by default, or can be set by user depending on need. For example, the predetermined area can be set to 4 cm².

Similarly to the above example, when the sensor detects that the electronic device is switching from the second mode to the first mode, for example, when the sensor 80 as shown in FIG. 9A senses that the regions of the light detecting array which satisfy the predetermined luminance threshold are decreasing or when the bending detector 90 as shown in FIG. 9B senses that the bending angle of the connecting body 30 has changed, the decreased area of the exposed region of the display of the first body 10 can be computed based on the position of the part of the light detecting array which satisfy the predetermined luminance threshold detected by the light sensor 80 or the specific dimensions of the first body 10, the connecting body 30 and the second body 20 as well as the current bending angle of the connecting body 30. Whenever the sensor detects that the exposed region of the display of the first body decreases by predetermined area, the display control sub-processor can control the display 70 of the first body to only light the decreased current exposed region of the display 70, and the display control sub-processor can control the display content of the display 70 to be gradually simple with the decrease of the area of the exposed region of the display 70. When the sensor detects that the entire mode switching procedure has been ended, i.e., when the electronic device comes into the first mode, the electronic device only has a smaller exposed region 701. In this case, the display control sub-processor controls the display 70 to only light the exposed region 701, and the simple information and/or instant information is displayed in the display region 701. Wherein, as described above, the predetermined area can be set by default, or can be set by user depending on need.

Next, different examples of switching of display content during a mode switching will be described in detail. Herein, it should be noted that, the area of a first non-covered part of the display in the first mode is less than the area of a second non-covered part of the display in the second mode.

As a first example, suppose that in the second mode, the display 70 displays a third content. When the sensor detects that the electronic device 1 switches from the second mode to the first mode with the first manner described above, the display control sub-processor controls the display 70 to switch from displaying the third content to displaying a first content.

Because, as described above, area of a first non-covered part of the display in the first mode is smaller than area of a second non-covered part of the display in the second mode, thus, the first content that can be displayed in the first mode certainly is less than the second content that can be displayed in the second mode. Here, the first content is a part of the third content, and the first content is different than a first sub-content of the third content, the first sub-content is a content displayed in the second mode in the region where the first content resides. That is to say, although the first content is a part of the third content, it is not simply cutting the third content as it is, instead, it is a simplified re-combination of respective items in the third content. That is to say, when switching from the second mode to the first mode with the first manner, it is possible to switch the electronic device to a more simplified operating mode.

Figure 10A:
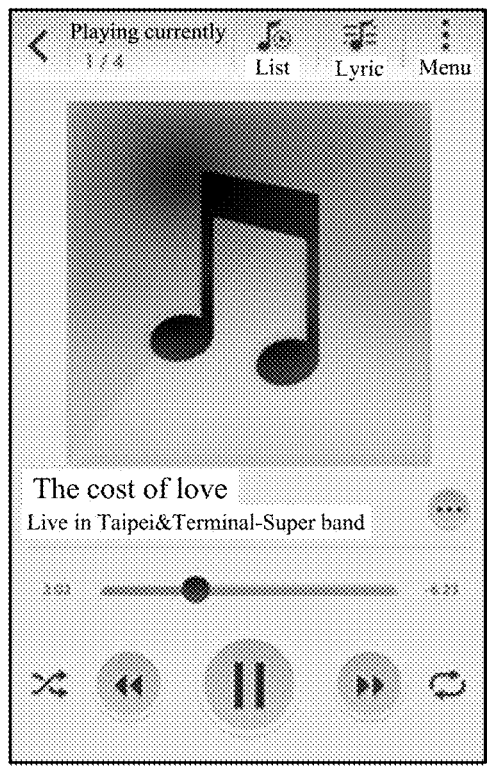
FIG. 10A illustrates an example of display content when an exposed region (the non-covered part) of the display is large.
Figure 10B:
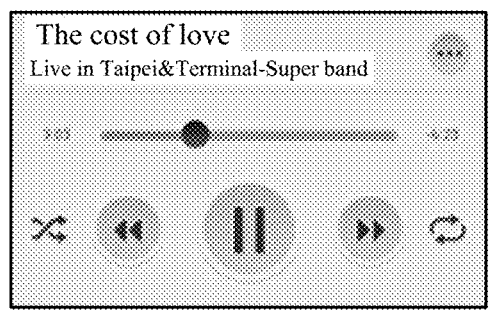
FIG. 10B illustrates an example of display content when an exposed region (the non-covered part) of the display is small.

For example, FIG. 10A shows an example of the display content when the exposed region (i.e., non-covered part) of the display 70 is large, whereas FIG. 10B shows another example of the display content when the exposed region (i.e., non-covered part) of the display 70 is small. As shown in FIGS. 10A and 10B, the third content may be a complete content that comprises playback control buttons (comprising play, pause, fast forward, etc.), a playback progress bar, lyrics, album covers, etc., and the first content may be a simplified content that comprises only the playback control buttons and the playback progress bar. Of course, in the first content, layout of the playback control buttons and the playback progress bar needs to be re-arranged.

It is usually recognized that, when the user changes from the second mode to the first mode with the first manner, there is a high possibility for the user to desire to further operate the electronic device, and since valid area that executes displaying of the display reduces, thus displaying is switched to the simplified content display to facilitate further operating of the user.

On the other hand, suppose in the first mode, the display 70 displays the first content. When the sensor detects that the electronic device 1 switches from the first mode to the second mode with the first manner described above, the display control sub-processor controls the display 70 to switch from displaying the first content to displaying the third content.

As a second example, suppose in the third mode, the display 70 displays a fourth content, when the sensor detects that the electronic device 1 switches from the third mode to the first mode with the second manner described above, the display control sub-processor controls the display 70 to switch from displaying the fourth content to displaying a second content.

Figure 10C:
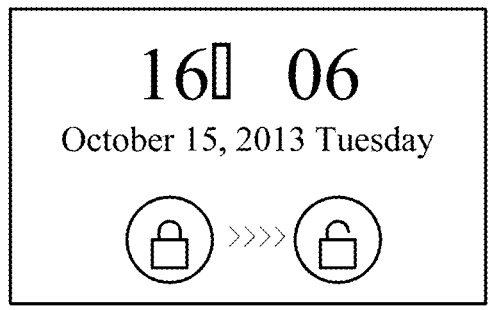
FIG. 10C illustrates another example of display content when an exposed region (the non-covered part) of the display is small.

Different from that the first content and the third content in the first example are relevant, in the second example, the second content is predetermined content, and the second content is irrelevant to the fourth content. Switching from the third mode to the first mode with the second manner can switch the electronic device to an operating mode requiring less power consumption and/or less operation procedures. For example, FIG. 10A shows an example of the display content when the exposed region (i.e., non-covered part) of the display 70 is large, whereas FIG. 10C shows another example of the display content when the exposed region (i.e., non-covered part) of the display 70 is small. As shown in FIGS. 10A and 10C, the fourth content may be also a complete content that comprises playback control buttons (comprising play, pause, fast forward, etc.), a playback progress bar, lyrics, album covers, etc., and the second content may be a screen lock interface.

It is usually recognized that, when the user changes the second mode to the third mode with the second manner, there is a high possibility for the user to desire to not operate the electronic device any more, thus the electronic device is directly switched to a screen lock mode and the display displays a screen lock interface so as to reduce power consumption effectively.

On the other hand, suppose in the first mode, the display 70 displays the second content. When the sensor detects that the electronic device 1 switches from the first mode to the third mode with the second manner described above, the display control sub-processor controls the display 70 to switch from displaying the second content to displaying the fourth content.

In the above, situations of switching between the first mode and the second mode with the first manner and switching between the first mode and the third mode with the second manner are respectively illustrated with two independent examples. However, it is also possible to combine the first example and the second example, that is, in one example, the situations of switching between the first mode and the second mode with the first manner and switching between the first mode and the third mode with the second manner are both comprised.

As a third example, suppose in the second mode, the display 70 displays a fifth content. When the sensor detects that the electronic device 1 switches from the first mode to the second mode with the first manner described above, the display control sub-processor controls the display 70 to switch from displaying the fifth content of the first application to displaying a sixth content of the first application. And suppose in the third mode, the display 70 displays a seventh content of the first application. In the third example, what should be focused on is that display content will be different when switching to the first mode with different manners (the first manner or the second manner) in a case where the same application is displayed in the second mode and the third mode. Here, it should be noted that, since area of the second non-covered part of the display in the second mode is smaller than area of the third non-covered part of the display in the third mode, thus even if the same application is displayed in the second mode and third mode, content of the same application will be different slightly. Therefore, in the above, the two are differentiated with the fifth content of the first application and the seventh content of the first application. When the sensor detects that the electronic device 1 switches from the third mode to the first mode with the second manner, the display control sub-processor controls the display 70 to switch from displaying the seventh content of the first application to displaying an eighth content of an application other than the first application, wherein the eighth content of the application other than the first application is irrelevant to the seventh content of the first application. For example, the eighth content of the application other than the first application may be a screen lock interface.

In this way, when the user changes the second mode to the first mode with the first manner, there is a high possibility for the user to desire to further operate the electronic device, and when the user changes the third mode to the first mode with the second manner, there is a high possibility for the user to desire to not operate the electronic device any more, thus the display control sub-processor is configured to switch the display content from the fifth content of the first application to the sixth content thereof when switching the second mode to the first mode with the first manner, wherein the sixth content and the fifth content are relevant, so as to facilitate further operating of the user, and the display control sub-processor is configured to switch the display content from the seventh content of the first application to the eighth content of an application other than the first application when switching the third mode to the first mode with the second manner, so as to facilitate reducing power consumption effectively.

The sixth content of the first application may be generated in two ways below. Similar to the first example described above, the sixth content of the first application may be a part of the fifth content of the first application, but different than a first sub-content of the fifth content, the first sub-content is content displayed in the second mode in the region where the fifth content resides. That is, the sixth content of the first application may be partially the same as the fifth content of the first application.

In addition, alternatively, the sixth content of the first application may be generated based on the fifth content of the first application, wherein the sixth content is different than the fifth content. For example, the first application is a shopping application, and the fifth content of the first application in the second mode is commodity information. When the electronic device switches from the second mode to the first mode with the first manner, the displayed sixth content of the first application is bar codes corresponding to the commodity.

Thus it can be seen that, after switching with the first manner, the sixth content may be the same as or completely different than the fifth content. However, the sixth content and the fifth content are relevant no matter the two are the same or not. In contrast, after switching with the second manner, the eighth content and the seventh content are not the same and are irrelevant.

As a fourth example, suppose that in the second mode, the display 70 displays the fifth content of the first application. The display control sub-processor is configured to further determine a type of the first application, and based on the type of the first application, the display control sub-processor controls content displayed after switching.

Specifically, when the sensor detects that the electronic device 1 switches from the second mode to the first mode, if the display control sub-processor further determines that the type of the first application is a continuous type, such as music player, navigation and other applications, then the display control sub-processor controls the display 70 to display a sixth content of the first application, the sixth content is a part of the fifth content, and it is different than a first sub-content of the fifth content, the first sub-content is content displayed in the second mode in the region where the fifth content resides. For example, the display control sub-processor further determines that the type of the first application is a continuous type, then the display control sub-processor controls to display a simplified interface of the first application, in the simplified interface, a part of the complete content is selected to display. For example, the first application is a music player, after switching from the second mode to the first mode, the first content changes into a part of content selected from among a complete content of playback control buttons (comprising play, pause, fast forward, etc.), a playback progress bar, lyrics, album covers, etc., such as the playback control buttons and the playback progress bar. Alternatively, the display control sub-processor may also control the display 70 to display a sixth content of the first application, the sixth content is generated based on the first content and is different than the fifth content. For example, if the display control sub-processor determines that the type of the first application is a continuous type, then the display control sub-processor may also re-generate a simplified interface of the first application. For example, the first application is a navigation application, after switching from the second mode to the first mode, the first content changes into arrow navigation, the arrow navigation here is completely different than a complete navigation content displayed previously.

On the other hand, if the display control sub-processor determines that the type of the first application is a non-continuous type, then the display control sub-processor controls the display 70 to display an eighth content of an application other than the first application, wherein the eighth content of an application other than the first application is irrelevant to the fifth content of the first application. For example, if the display control sub-processor determines that the type of the first application is a non-continuous type, then the display control sub-processor controls the display 70 to display a screen lock interface.

In this way, when the user changes the second mode to the first mode in a case where the current running application is a continuous-type application, there is a high possibility for the user to desire to further operate the electronic device 1, and when the user changes the second mode to the first mode in a case where the current running application is a non-continuous-type application, there is a high possibility for the user to desire to not operate the electronic device any more, thus the display control sub-processor is configured to switch the display content from the fifth content of the first application to the sixth content thereof in the case where the current running application is a continuous-type application, wherein the sixth content and the fifth content are relevant, so as to facilitate further operating of the user, and the display control sub-processor is configured to switch the display content from the fifth content of the first application to the eighth content of an application other than the first application when switching from the second mode to the first mode in the case where the current running application is a non-continuous-type application, so as to facilitate reducing power consumption effectively.

As a fifth example, suppose that in the second mode, the display 70 displays the fifth content of the first application. Different than the display control sub-processor is configured to further determine a type of the first application in the fourth example, in the fifth example, the display control sub-processor is configured to further determine a type of an operation that is being current executed, and based on the type of an operation that is being current executed, the display control sub-processor controls content displayed after a switching. That is to say, even if the type of the application that is currently running is a continuous-type application, but no continuous-type operation (such as executing music playing, executing a navigation, and other operations) is executed currently, then the displaying is still switched to the eighth content of an application other than the first application.

Specifically, when the sensor detects that the electronic device 1 switches from the second mode to the first mode, if the display control sub-processor further determines that the type of the operation is a continuous type, such as executing music playing, executing a navigation and other operations, then the display control sub-processor controls the display 70 to display a sixth content of the first application, the sixth content is a part of the fifth content, and it is different than a first sub-content of the fifth content, the first sub-content is content displayed in the second mode in the region where the fifth content resides. For example, the display control sub-processor further determines that the type of the operation is a continuous type, then the display control sub-processor controls to display a simplified interface of the first application. Alternatively, the display control sub-processor may also control the display 70 to display a sixth content of the first application, the sixth content is generated based on the fifth content and is different than the fifth content. For example, if the display control sub-processor determines that the type of the first operation is a continuous type, then the display control sub-processor may also re-generate a simplified interface of the first application.

On the other hand, if the display control sub-processor determines that the type of the operation is a non-continuous type, then the display control sub-processor controls the display 70 to display an eighth content of an application other than the first application, wherein the eighth content of an application other than the first application is irrelevant to the fifth content of the first application. For example, if the display control sub-processor determines that the type of the operation is a non-continuous type, then the display control sub-processor controls the display 70 to display a screen lock interface.

In this way, when the user changes the second mode to the first mode in the case where the type of an operation that is being currently executed is a continuous type, there is a high possibility for the user to desire to further operate the electronic device 1, and when the user changes the second mode to the first mode in the case where the type of an operation that is being currently executed is a non-continuous type, there is a high possibility for the user to desire to not operate the electronic device any more, thus the display control sub-processor is configured to switch the fifth content of the first application to the sixth content thereof in the case where the type of an operation that is being current executed is a continuous type, wherein the sixth content and the fifth content are relevant, so as to facilitate further operating of the user, and the display control sub-processor is configured to switch the fifth content of the first application to the eighth content of an application other than the first application when switching the second mode to the first mode in the case where the type of an operation that is being currently executed is a non-continuous type, so as to facilitate reducing power consumption effectively.

Figure 11:
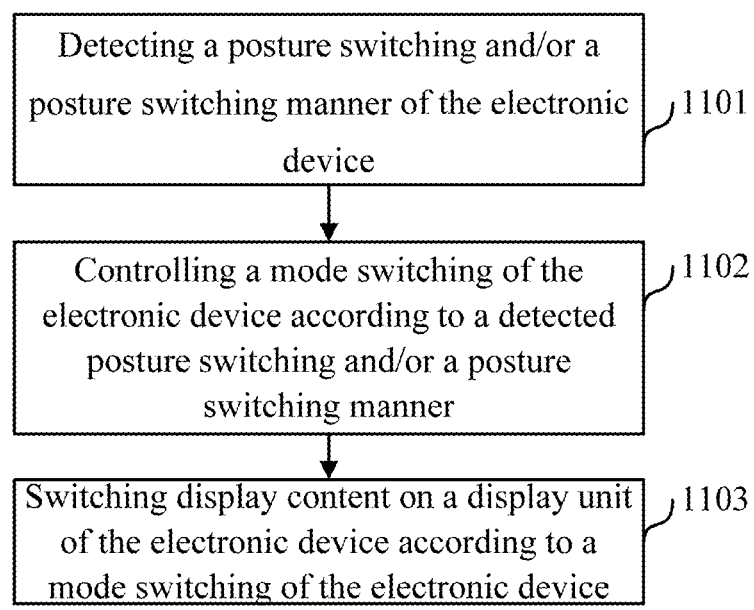
FIG. 11 is a first flowchart illustrating a mode switching method according to an embodiment of the present disclosure.

Next, the specific process of mode switching method according to the embodiment of the disclosure is described with reference to FIG. 11. As shown in FIG. 11, the mode switching method according to an embodiment of the present disclosure comprises steps provided below.

In step S1101, a posture switching and/or a posture switching manner of the electronic device is detected. As described above, the electronic device comprises: a first body; a connecting body; a second body being connected to the first body through the connecting body; wherein based on the connecting body, the electronic device has at least three postures, wherein in a first posture the first body and the second body have a first relative positional relationship, in a second posture the first body and the second body have a second relative positional relationship, and in a third posture the first body and the second body have a third relative positional relationship, the first relative positional relationship, the second relative positional relationship, and the third positional relationship are different from each other; and the electronic device can switch from the second posture to the first posture with a first manner, and switch from the third posture to the first posture with a second manner, wherein the first manner and the second manner are different. A posture switching and/or a posture switching manner of the electronic device can be detected by the sensor disposed in the first body and/or the connecting body and/or the second body. Then, the process proceeds to step S1102.

In step S1102, a mode switching of the electronic device is controlled according to a detected posture switching and/or posture switching manner. Then, the process proceeds to step S1103.

In step S1103, display content on a display of the electronic device is switched according to a mode switching of the electronic device.

As a first example, suppose that in the second posture, the display 70 displays a third content. When the electronic device 1 switching from the second posture to the first posture with the first manner described above is detected, the display 70 is controlled to switch from displaying the third content to displaying a first content.

Because, as described above, area of a first non-covered part of the display in the first posture is smaller than area of a second non-covered part of the display in the second posture, thus, the first content that can be displayed in the first posture certainly is less than the second content that can be displayed in the second posture. Here, the first content is a part of the third content, and the first content is different than a first sub-content of the third content, the first sub-content is a content displayed in the second posture in the region where the first content resides. That is to say, although the first content is a part of the third content, it is not simply cutting the third content as it is, instead, it is a simplified re-combination of respective items in the third content.

On the other hand, suppose in the first posture, the display 70 displays the first content. When the electronic device 1 switching from the first posture to the second posture with the first manner described above is detected, the display 70 is controlled to switch from displaying the first content to displaying the third content.

As a second example, suppose in the third posture, the display 70 displays a fourth content, when the electronic device 1 switching from the third posture to the first posture with the second manner described above is detected, the display 70 is controlled to switch from displaying the fourth content to displaying a second content.

Different from that the first content and the third content in the first example are relevant, in the second example, the second content is predetermined content, and the second content is irrelevant to the fourth content.

On the other hand, suppose in the first posture, the display 70 displays the second content. When the electronic device 1 switching from the first posture to the third posture with the second manner described above is detected, the display 70 is controlled to switch from displaying the second content to displaying the fourth content.

As a third example, suppose in the second posture, the display 70 displays a fifth content of a first application. When the electronic device 1 switching from the first posture to the second posture with the first manner described above is detected, the display 70 is controlled to switch from displaying the fifth content of the first application to displaying a sixth content of the first application. And suppose in the third posture, the display 70 displays a seventh content of the first application. In the third example, what should be focused on is that display content will be different when switching to the first posture with different manners (the first manner or the second manner) in a case where the same application is displayed in the second posture and the third posture. Here, it should be noted that, since area of the second non-covered part of the display in the second posture is smaller than area of the third non-covered part of the display in the third posture, thus even if the same application is displayed in the second posture and third posture, content of the same application will be different slightly. Therefore, in the above, the two are differentiated with the fifth content of the first application and the seventh content of the first application. When the electronic device 1 switching from the third posture to the first posture with the second manner is detected, the display 70 is controlled to switch from displaying the seventh content of the first application to displaying an eighth content of an application other than the first application, wherein the eighth content of the application other than the first application is irrelevant to the seventh content of the first application. For example, the eighth content of the application other than the first application may be a screen lock interface.

As a fourth example, suppose that in the second posture, the display 70 displays the fifth content of the first application. The mode switching method further includes determining a type of the first application, and based on the type of the first application, controlling content displayed after switching.

On the other hand, if the type of the first application is determined to be a non-continuous type, then the display 70 is controlled to display an eighth content of an application other than the first application, wherein the eighth content of an application other than the first application is irrelevant to the fifth content of the first application. For example, if the type of the first application is determined to be a non-continuous type, then the display control sub-processor controls the display 70 to display a screen lock interface.

As a fifth example, suppose that in the second posture, the display 70 displays the fifth content of the first application. Different from further determining a type of the first application in the fourth example, in the fifth example, the mode switching method further includes determining a type of an operation that is being current executed, and based on the type of an operation that is being current executed, controlling content displayed after switching. That is to say, even if the type of the application that is currently running is a continuous-type application, but no continuous-type operation (such as executing music playing, executing a navigation, and other operations) is executed currently, then the displaying is still switched to the eighth content of an application other than the first application.

On the other hand, if the type of the operation is determined to be a non-continuous type, then the display 70 is controlled to display an eighth content of an application other than the first application, wherein the eighth content of an application other than the first application is irrelevant to the fifth content of the first application. For example, if the type of the operation is determined to be a non-continuous type, then the display control sub-processor controls the display 70 to display a screen lock interface.

Hereinabove, the electronic device and the mode switching method applied to the electronic device according to the embodiments of the disclosure have been described in details with reference to accompany figures. By the electronic device and the mode switching method applied to the electronic device according to the embodiments of the disclosure, switching can be performed among three postures with two different manners, and the display content after switching can be controlled based on the different switching manners, so that the usage mode is flexible and the user's experience is high.

It should be noted that, in the specification, the terms "comprise", "comprise" and any other variations thereof intend to cover nonexclusive inclusion so that the procedure, the method, the product or the equipment comprising a series of elements comprise not only these elements, but also other elements which are not listed explicitly, or also comprise inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and comprise several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:

1. An electronic device, comprising:
a first body;
a connecting body;
a second body being connected to the first body through the connecting body;
wherein based on the connecting body, the electronic device has at least three modes, wherein in a first mode the first body and the second body have a first relative positional relationship, in a second mode the first body and the second body have a second relative positional relationship, and in a third mode the first body and the second body have a third relative positional relationship, the first relative positional relationship, the second relative positional relationship, and the third positional relationship are different from each other; and
the electronic device can switch from the second mode to the first mode with a first manner, and switch from the third mode to the first mode with a second manner, wherein the first manner and the second manner are different,
the electronic device further comprising:
a sensor disposed in the first body and/or the connecting body and/or the second body, and configured to detect a mode switching and/or a mode switching manner of the electronic device; and
a processor disposed in the first body and/or the connecting body and/or the second body, and configured to control a mode switching of the electronic device according to a mode switching and/or a mode switching manner detected by the sensor,
wherein the processor comprises a display control sub-processor, which switches display content on the display according to a mode switching of the electronic device,
wherein in the first mode, the display control sub-processor controls the display to display a first content if the sensor detects that the electronic device switches from the second mode to the first mode with the first manner, wherein the first content is relevant to a third content displayed in the second mode,
wherein in the first mode, the display control sub-processor controls the display to display a second content if the sensor detects that the electronic device switches from the third mode to the first mode with the second manner, wherein the second content is a predetermined content, and the second content is irrelevant to a fourth content displayed in the third mode, wherein the first manner is a sliding motion and the second manner is a rotating motion.

2. The electronic device of claim 1, further comprising a display disposed at least on the first surface of the first body, wherein an area of a first non-covered part of the display in the first mode is different than an area of a second non-covered part of the display in the second mode.

3. The electronic device of claim 2, wherein the display is a deformable display, the display is disposed at least in a region formed by et surface of the first body and the first surface of the second body; or the display is disposed in a region formed by the first surface of the first body, the first surface of the connecting body, and the first surface of the second body; and in the first mode and the second mode, one part of the display covers another part of the display.

4. The electronic device of claim 1, wherein area of a first non-covered part of the display in the first mode is less than area of a second non-covered part of the display in the second mode.

5. The electronic device of claim 4, wherein in the second mode, the display displays a fifth content of a first application, when the sensor detects that the electronic device switches from the second mode to the first mode with the first manner, the display control sub-processor controls the display to switch from displaying the fifth content of the first application to displaying a sixth content of the first application; and in the third mode, the display displays a seventh content of the first application, when the sensor detects that the electronic device switches from the third mode to the first mode with the second manner, the display control sub-processor controls the display to switch from displaying the seventh content of the first application to displaying a eighth content of an application other than the first application, wherein the eighth content of the application other than the first application is irrelevant to the seventh content.

6. The electronic device of claim 5, wherein the sixth content of the first application is a part of the fifth content of the first application, and the sixth content is different from a first sub-content of the fifth content, the first sub-content is content displayed in the second mode in the region where the fifth content resides; or the sixth content of the first application is generated based on the fifth content of the first application, wherein the sixth content is different from the fifth content.

7. The electronic device of claim 4, wherein in the second mode, the display displays a fifth content of a first application, and the display control sub-processor is further configured to determine type of the first application; and when the sensor detects that the electronic device switches from the second mode to the first mode, if the display control sub-processor determines that the type of the first application is a continuous type, then the display control sub-processor controls the display to display a sixth content of the first application, wherein the sixth content is a part of the fifth content, and the sixth content is different than a first sub-content of the fifth content, the first sub-content is a content displayed in the second mode in the region where the fifth content resides; if the display control sub-processor determines that the type of the first application is a non-continuous type, then the display control sub-processor controls the display to display an eighth content of an application other than the first application, wherein the eighth content of the application other than the first application is irrelevant to the fifth content of the first application.

8. The electronic device of claim 1, wherein the difference between the first manner and the second manner comprises movement modes of the second body in the first manner and the second manner are different.

9. The electronic device of claim 8, wherein
in the second mode, with the first manner, the second body and the first body move relatively in parallel, wherein an angle between the first body and the second body maintains constant and less than a second predetermined threshold, and the electronic device switches from the second mode to the first mode;
in the third mode, with the second manner, the second body and the first body rotate relatively, wherein the angle between the first body and the second body reduces continuously, and the electronic device switches from the third mode to the first mode.

10. The electronic device of claim 8, wherein
in the second mode, with the first manner, the second body moves while maintaining the distance between the sixth end and the first surface of the first body as smaller than a first predetermined threshold, and the electronic device switches from the second mode to the first mode;
in the third mode, with the second manner, the second body moves while distance between the sixth end and the first surface of the first body is made to increase from a second predetermined threshold to a maximum and then reduce to below a first predetermined threshold, and the electronic device switches from the third mode to the first mode.

11. A mode switching method applied to an electronic device, the mode switching method comprising:
detecting a posture switching and/or a posture switching manner of the electronic device; and
controlling a mode switching of the electronic device according to a detected posture switching and/or posture switching manner;
wherein the electronic device comprises:
a first body;
a connecting body;
a second body being connected to the first body through the connecting body;
wherein based on the connecting body, the electronic device has at least three postures, wherein in a first posture the first body and the second body have a first relative positional relationship, in a second posture the first body and the second body have a second relative positional relationship, and in a third posture the first body and the second body have a third relative positional relationship, the first relative positional relationship, the second relative positional relationship, and the third positional relationship are different from each other; and
the electronic device can switch from the second posture to the first posture with a first manner, and switch from the third posture to the first posture with a second manner, wherein the first manner and the second manner are different,
wherein in the first mode, controlling the display to display a first content if detecting that the electronic device switches from the second mode to the first mode with the first manner, wherein the first content is relevant to a third content displayed in the second mode,
wherein in the first mode, controlling the display to display a second content if detecting that the electronic device switches from the third mode to the first mode with the second manner, wherein the second content is a predetermined content, and the second content is irrelevant to a fourth content displayed in the third mode, wherein the first manner is a sliding motion and the second manner is a rotating motion.

12. The electronic device as claimed in claim 1, wherein the first body has a first end and a second end;

the connecting body has a third end and a fourth end, the third end being connected to the second end;

the second body has a fifth end and a sixth end, the fifth end being connected to the fourth end, wherein the first body is capable of rotating around the second body.

13. The electronic device of claim 12, wherein in the first mode, a first surface of the first body is covered by the connecting body and the second body; in the second mode, a surface composed by the first surface of the first body and a first surface of the connecting body is covered by the second body; and in the third mode, a first outer surface is composed by the first surface of the first body, the first surface of the connecting body and the first surface of the second body, and in the third mode, the first outer surface is flat or approximately flat.

14. The electronic device of claim 12, wherein in the second mode, with the first manner, an external force that has a component in the direction from the fifth end to the sixth end is applied on the second body, a magnitude of the external force satisfies a second predetermined condition, and the electronic device switches from the second mode to the first mode;

in the third mode, with the second manner, an external force that has a component in the rotary direction from the sixth end to be close to the first surface of the first body is applied on the second body, a magnitude of the external force satisfies a third predetermined condition, and the electronic device switches from the third mode to the first mode.

15. The electronic device of claim 12, wherein the connecting body comprises at least three rotary members, each of the at least three rotary members has a self-rotary shaft, such that respective self-rotary shafts of the at least three rotary members are parallel to each other, and when an external force applied on one rotary member is vertical to the self-rotary shaft thereof and a magnitude of a component in a direction tangential to an outer surface of the one rotary member satisfies a second predetermined condition, the one rotary member is capable of rotating around the self-rotary shaft thereof.

16. The electronic device of claim 15, wherein when the one rotary member rotates, the other rotary members rotate accordingly; or when the one rotary member rotates, at least one of the other rotary members does not rotate.

17. The electronic device of claim 15, wherein the connecting body includes the at least three rotary members; or the connecting body comprises two rotary member groups and at least one non-rotary member between the two rotary member groups, each rotary member group comprises at least two rotary members.

* * * * *